US012748043B2

(12) United States Patent
Hanada et al.

(10) Patent No.: US 12,748,043 B2
(45) Date of Patent: Sep. 29, 2026

(54) ANALYSIS DEVICE AND ANALYSIS METHOD

(71) Applicant: HORIBA, LTD., Kyoto (JP)

(72) Inventors: Takaaki Hanada, Kyoto (JP); Naoki Nagura, Kyoto (JP); Kyoji Shibuya, Kyoto (JP); Kenji Hara, Kyoto (JP)

(73) Assignee: HORIBA, LTD. (JP)

( * ) Notice: Subject to any disclaimer, the term of this patent is extended or adjusted under 35 U.S.C. 154(b) by 168 days.

(21) Appl. No.: 18/704,347

(22) PCT Filed: Nov. 25, 2022

(86) PCT No.: PCT/JP2022/043560

§ 371 (c)(1),
(2) Date: Apr. 24, 2024

(87) PCT Pub. No.: WO2023/095876

PCT Pub. Date: Jun. 1, 2023

(65) Prior Publication Data

US 2024/0418637 A1 Dec. 19, 2024

(30) Foreign Application Priority Data

Nov. 25, 2021 (JP) ................................ 2021-191221

(51) Int. Cl.
*G01N 21/3504* (2014.01)

(52) U.S. Cl.
CPC ................................ *G01N 21/3504* (2013.01)

(58) Field of Classification Search
CPC ................................................ G01N 21/3504
See application file for complete search history.

(56) References Cited

U.S. PATENT DOCUMENTS

| | | | |
|---|---|---|---|
| 5,703,365 | A | 12/1997 | Ishihara et al. |
| 2018/0172581 | A1 | 6/2018 | Shibuya et al. |
| 2020/0072740 | A1 | 3/2020 | Venturini et al. |

FOREIGN PATENT DOCUMENTS

| | | | |
|---|---|---|---|
| EP | 1850112 | A1 | 10/2007 |
| JP | 2006-052955 | A | 2/2006 |

(Continued)

OTHER PUBLICATIONS

International Search Report dated Feb. 7, 2023 issued in International patent application No. PCT/JP2022/043560.

(Continued)

*Primary Examiner* — Jamil Ahmed
(74) *Attorney, Agent, or Firm* — Brooks Kushman P.C.

(57) ABSTRACT

The present invention measures with high accuracy a concentration of a measurement target component contained in a combustion gas, in which a concentration of nitric oxide is calculated based on absorption by the nitric oxide, a concentration of nitrogen dioxide is calculated based on absorption by the nitrogen dioxide, a concentration of nitrous oxide is calculated based on absorption by the nitrous oxide, a concentration of ammonia is calculated based on absorption by the ammonia, a concentration of ethane is calculated based on absorption by the ethane, a concentration of formaldehyde or acetaldehyde is calculated based on absorption by the formaldehyde or the acetaldehyde, a concentration of sulfur dioxide is calculated based on absorption by the sulfur dioxide, a concentration of methane is calculated based on absorption by the methane, and a concentration of methanol or ethanol is calculated based on absorption by the methanol or the ethanol.

8 Claims, 12 Drawing Sheets

(56) References Cited

FOREIGN PATENT DOCUMENTS

| | | | | | |
|---|---|---|---|---|---|
| JP | 2011191246 | A | * | 9/2011 | ............. G01N 21/39 |
| JP | 5594514 | B2 | | 9/2014 | |
| JP | 2016-090521 | A | | 5/2016 | |
| JP | 2020505599 | A | | 2/2020 | |
| JP | 2020519878 | A | | 7/2020 | |
| WO | 1995/026497 | A1 | | 10/1995 | |
| WO | 2006/085646 | A1 | | 8/2006 | |
| WO | 2018134601 | A1 | | 7/2018 | |
| WO | WO-2021124937 | A1 | * | 6/2021 | ......... G01N 21/3504 |

OTHER PUBLICATIONS

EESR dated Oct. 16, 2025 issued in EP patent application No. 22898658.4.

Office Action dated May 12, 2026 issued in JP patent application No. 2023-563756.

* cited by examiner (a)

| AMBIENT TEMPERATURE T(°C) | $T_1$ | $T_2$ | $T_3$ | ... | $T_N$ |
|---|---|---|---|---|---|
| PARAMETER P(Δλ) | $P_1(\Delta\lambda)$ | $P_2(\Delta\lambda)$ | $P_3(\Delta\lambda)$ | ... | $P_N(\Delta\lambda)$ |

(b)

| AMBIENT TEMPERATURE T(°C) | $T_1$ | $T_2$ | $T_3$ | ... | $T_N$ |
|---|---|---|---|---|---|
| PARAMETER P(Δw) | $P_1(\Delta w)$ | $P_2(\Delta w)$ | $P_3(\Delta w)$ | ... | $P_N(\Delta w)$ |

Fig.8

ANALYSIS DEVICE AND ANALYSIS METHOD

CROSS-REFERENCE TO RELATED APPLICATIONS

This application is the U.S. national phase of PCT Application No. PCT/JP2022/043560, filed Nov. 25, 2022, which claims priority to Japanese Patent Application No. 2021-191221, filed Nov. 25, 2021, the disclosures of which are incorporated in their entirety by reference herein.

TECHNICAL FIELD

The present invention relates to an analysis device or the like used for, for example, component analysis of a gas.

BACKGROUND ART

When a measurement target component is measured that is at least one of nitric oxide (NO), nitrogen dioxide ($NO_2$), nitrous oxide ($N_2O$), ammonia ($NH_3$), ethane ($C_2H_6$), formaldehyde (HCHO), acetaldehyde ($CH_3CHO$), sulfur dioxide ($SO_2$), methane ($CH_4$), methanol ($CH_3OH$), or ethanol ($C_2H_5OH$) in a combusted exhaust gas discharged from an internal combustion engine, an external combustion engine, a turbine, a power plant, or the like, a measurement error occurs due to an interference component that is a component other than the measurement target component, such as water ($H_2O$) and/or carbon dioxide ($CO_2$) contained in the combusted exhaust gas. Specifically, an absorption spectrum of the interference component overlaps at the position of the absorption peak of the measurement target component, and an error occurs in quantifying a concentration.

On the other hand, as a technique for correcting the interference influence of the interference component on the measurement target component, a technique described in Patent Literature 1 is considered.

CITATION LIST

Patent Literature

Patent Literature 1: JP 2016-090521 A

SUMMARY OF INVENTION

Technical Problems

However, also in the case of using an analysis device of Patent Literature 1, in order to more effectively reduce the interference influence on the measurement target component in the combusted exhaust gas, it is necessary to use, for measurement, a wavelength range in which appropriate absorption by the measurement target component exists. For selection of the wavelength range, preliminary examination can be performed to some extent by using a publicly available infrared absorption spectral database such as HITRAN. However, types of gases and wavelength ranges available in the database are limited, and the selection of the wavelength range is enabled only through actually repeating experiments with a measurement target gas and an interference gas. In addition, even for an identical measurement target component, an appropriate wavelength range varies depending on the concentration, pressure, and temperature of the measurement target component, or the type or concentration range of a coexisting interference gas. In the analysis device of Patent Literature 1, an appropriate wavelength range for more effectively reducing the interference influence is not considered, and it cannot be said that the interference influence on the measurement target component can be effectively removed only by this.

Therefore, the present invention has been made in view of the above problems, and it is a main object of the present invention to more effectively reduce interference influence on a concentration of a measurement target component that is at least one of nitric oxide, nitrogen dioxide, nitrous oxide, ammonia, ethane, formaldehyde, acetaldehyde, sulfur dioxide, methane, methanol, or ethanol contained in a combustion gas, and to perform measurement with high accuracy.

Solutions to Problems

That is, an analysis device according to the present invention is an analysis device configured to measure a concentration of a measurement target component that is at least one of nitric oxide (NO), nitrogen dioxide ($NO_2$), nitrous oxide ($N_2O$), ammonia ($NH_3$), ethane ($C_2H_6$), formaldehyde (HCHO), acetaldehyde ($CH_3CHO$), sulfur dioxide ($SO_2$), methane ($CH_4$), methanol ($CH_3OH$), or ethanol ($C_2H_5OH$) contained in a combustion gas. The analysis device includes: a laser light source configured to irradiate the combustion gas with reference light; a light detector configured to detect intensity of sample light obtained when the reference light is transmitted through the combustion gas; and a concentration calculation unit configured to calculate the concentration of the measurement target component based on an output signal from the light detector. The concentration calculation unit is configured to: when a concentration of the nitric oxide is measured, calculate the concentration of the nitric oxide based on absorption between 5.24 and 5.26 μm; when a concentration of the nitrogen dioxide is measured, calculate the concentration of the nitrogen dioxide based on absorption between 6.14 and 6.26 μm; when a concentration of the nitrous oxide is measured, calculate the concentration of the nitrous oxide based on absorption between 7.84 and 7.91 μm; when a concentration of the ammonia is measured, calculate the concentration of the ammonia based on absorption between 9.38 and 9.56 μm; when a concentration of the ethane is measured, calculate the concentration of the ethane based on absorption between 3.33 and 3.36 μm; when a concentration of the formaldehyde or the acetaldehyde is measured, calculate the concentration of the formaldehyde or the acetaldehyde based on absorption between 5.65 and 5.67 μm; when a concentration of the sulfur dioxide is measured, calculate the concentration of the sulfur dioxide based on absorption between 7.38 and 7.42 μm; when a concentration of the methane is measured, calculate the concentration of the methane based on absorption between 7.50 and 7.54 μm; and when a concentration of the methanol or the ethanol is measured, calculate the concentration of the methanol or the ethanol based on absorption between 9.45 and 9.47 μm. Note that examples of the combustion gas include an exhaust gas discharged from an internal combustion engine, an exhaust gas flowing in a flue, and a combustion gas generated by causing a sample to combust.

With this analysis device, it is possible to measure with high accuracy the concentration of the measurement target component that is at least one of nitric oxide (NO), nitrogen dioxide ($NO_2$), nitrous oxide ($N_2O$), ammonia ($NH_3$), ethane ($C_2H_6$), formaldehyde (HCHO), acetaldehyde ($CH_3CHO$), sulfur dioxide ($SO_2$), methane ($CH_4$), methanol ($CH_3OH$), or ethanol ($C_2H_5OH$) contained in the combustion gas. Details will be described later.

Further, the analysis device of the present invention can further reduce interference influence by modulating an oscillation wavelength of the laser light source to obtain an absorption-modulated signal or an absorption spectrum obtained through collecting absorption signals at respective wavelengths, and by utilizing a difference in features between absorption-modulated signals or absorption spectra of the measurement target component and the interference component. At this time, the difference is further obtained in the features between the absorption-modulated signals or the absorption spectra of the measurement target component and the interference component, as a wavelength modulation range is wider. However, in return for the wider wavelength modulation range, the proportion of the absorption peak of the measurement target component in the wavelength modulation range decreases, and thus measurement sensitivity decreases. Therefore, in view of their balance, it is desirable to set the wavelength modulation range between 0.1 and 2 $cm^{-1}$ in accordance with the shapes of the absorption-modulated signals or the absorption spectra of the measurement target component and the interference component.

Further, the analysis device of the present invention can perform measurement for the gases even when the gases are at a low concentration of 100 ppm or less by using, as a light source, a quantum cascade laser that oscillates laser light in a mid-infrared range in which each gas exhibits the strongest absorption while ensuring a long optical path length using a multireflection cell or a resonance cell. Here, the long optical path length is 1 m or more and 100 m or less, preferably 1 m or more and 50 m or less, more preferably 5 m or more and 30 m or less, still more preferably 5 m or more and 15 m or less.

When the analysis device of the present invention measures the concentration of nitric oxide (NO) at a low concentration of 100 ppm or less by using the multireflection cell or the like, the analysis device calculates the concentration of the nitric oxide (NO) based on absorption between 5.24 and 5.26 μm by the nitric oxide (NO). Here, the laser light source emits laser light at an oscillation wavelength including a wavelength of between 5.24 and 5.26 μm.

At a wavelength of between 5.24 and 5.26 μm, preferably a wavelength of between 5.245 and 5.247 μm, more preferably a wavelength of 5.2462 μm, one of the strongest absorption lines of nitric oxide (NO) exists, and the absorption intensity of water ($H_2O$), carbon dioxide ($CO_2$), and/or ethylene ($C_2H_4$), which are interference components contained in the combustion gas, in this wavelength range, is low, and their interference influence is small. As a result, accuracy of measuring the concentration of nitric oxide (NO) can be improved.

When the analysis device of the present invention measures the concentration of nitrogen dioxide ($NO_2$) at a low concentration of 100 ppm or less by using the multireflection cell or the like, the analysis device calculates the concentration of the nitrogen dioxide ($NO_2$) based on absorption between 6.14 and 6.26 μm by the nitrogen dioxide ($NO_2$). Here, the laser light source emits laser light at an oscillation wavelength including a wavelength of between 6.14 and 6.26 μm.

At a wavelength of between 6.14 and 6.26 μm, preferably a wavelength of between 6.145 and 6.254 μm, more preferably a wavelength of 6.2322 μm or 6.2538 μm, one of the strongest absorption lines of nitrogen dioxide ($NO_2$) exists, and the absorption intensity of water ($H_2O$) and/or ammonia ($NH_3$), which are interference components contained in the combustion gas, in this wavelength range, is low, and their interference influence is small. As a result, accuracy of measuring the concentration of nitrogen dioxide ($NO_2$) can be improved.

When the analysis device of the present invention measures the concentration of nitrous oxide ($N_2O$) at a low concentration of 100 ppm or less by using the multireflection cell or the like, the analysis device calculates the concentration of the nitrous oxide ($N_2O$) based on absorption between 7.84 and 7.91 μm by the nitrous oxide ($N_2O$). Here, the laser light source emits laser light at an oscillation wavelength including a wavelength of between 7.84 and 7.91 μm.

At a wavelength of between 7.84 and 7.91 μm, preferably a wavelength of between 7.845 and 7.907 μm, more preferably a wavelength of 7.8455 μm, 7.8509 μm, 7.8784 μm, or 7.9067 μm, one of the strongest absorption lines of nitrous oxide ($N_2O$) exists, and the absorption intensity of water ($H_2O$), methane ($CH_4$), and/or acetylene ($C_2H_2$), which are interference components contained in the combustion gas, in this wavelength range, is low, and their interference influence is small. As a result, accuracy of measuring the concentration of nitrous oxide ($N_2O$) can be improved.

When the analysis device of the present invention measures the concentration of ammonia ($NH_3$) at a low concentration of 100 ppm or less by using the multireflection cell or the like, the analysis device calculates the concentration of the ammonia ($NH_3$) based on absorption between 9.38 and 9.56 μm by the ammonia ($NH_3$). Here, the laser light source emits laser light at an oscillation wavelength including a wavelength of between 9.38 and 9.56 μm.

At a wavelength of between 9.38 and 9.56 μm, preferably a wavelength of between 9.384 and 9.557 μm, more preferably a wavelength of 9.3847 μm or 9.5566 μm, one of the strongest absorption lines of ammonia ($NH_3$) exists, and the absorption intensity of water ($H_2O$), carbon dioxide ($CO_2$), and/or ethylene ($C_2H_4$), which are interference components contained in the combustion gas, in this wavelength range, is low, and their interference influence is small. As a result, accuracy of measuring the concentration of ammonia ($NH_3$) can be improved.

When the analysis device of the present invention measures the concentration of ethane ($C_2H_6$) at a low concentration of 100 ppm or less by using the multireflection cell or the like, the analysis device calculates the concentration of the ethane ($C_2H_6$) based on absorption between 3.33 and 3.36 μm by the ethane ($C_2H_6$). Here, the laser light source emits laser light at an oscillation wavelength including a wavelength of between 3.33 and 3.36 μm.

At a wavelength of between 3.33 and 3.36 μm, preferably a wavelength of between 3.336 and 3.352 μm, more preferably a wavelength of 3.3368 μm, 3.3482 μm, or 3.3519 μm, one of the strongest absorption lines of ethane ($C_2H_6$) exists, and the absorption intensity of water ($H_2O$), methane ($CH_4$), and/or ethylene ($C_2H_4$), which are interference components contained in the combustion gas, in this wavelength range, is low, and their interference influence is small. As a result, accuracy of measuring the concentration of ethane ($C_2H_6$) can be improved.

At a wavelength of 3.3406 μm, the absorption intensity of ethane ($C_2H_6$) is lower than the absorption intensity at the wavelength of 3.3368 μm, 3.3482 μm, or 3.3519 μm, but an absorption line of water ($H_2O$) exists in the vicinity of this wavelength, and simultaneous measurement of ethane ($C_2H_6$) and water ($H_2O$) can be performed.

When the analysis device of the present invention measures the concentration of formaldehyde (HCHO) or acetaldehyde ($CH_3CHO$) at a low concentration of 100 ppm or less by using the multireflection cell or the like, the analysis device calculates the concentration of the formaldehyde (HCHO) or the acetaldehyde ($CH_3CHO$) based on absorption between 5.65 and 5.67 μm by the formaldehyde (HCHO) or the acetaldehyde ($CH_3CHO$). Here, the laser light source emits laser light at an oscillation wavelength including a wavelength of between 5.65 and 5.67 μm.

At a wavelength of between 5.65 and 5.67 μm, preferably a wavelength of between 5.651 and 5.652 μm, more preferably a wavelength of 5.6514 μm, one of the strongest absorption lines of formaldehyde (HCHO) exists, and the absorption intensity of water ($H_2O$) and/or ammonia ($NH_3$), which are interference components contained in the combustion gas, in this wavelength range, is low, and their interference influence is small. As a result, accuracy of measuring the concentration of formaldehyde (HCHO) can be improved. In addition, this wavelength fits in a strong absorption band of acetaldehyde ($CH_3CHO$), and thus measurement of acetaldehyde ($CH_3CHO$) or simultaneous measurement of formaldehyde (HCHO) and acetaldehyde ($CH_3CHO$) can be performed.

At a wavelength of between 5.65 and 5.67 μm, preferably a wavelength of between 5.665 and 5.667 μm, more preferably a wavelength of 5.6660 μm, the absorption intensity of formaldehyde (HCHO) is slightly lower than the absorption intensity at the wavelength of 5.6514 μm, but the absorption intensity of water ($H_2O$) is further lower, and its interference influence is smaller. As a result, accuracy of measuring the concentration of formaldehyde (HCHO) can be improved. In addition, this wavelength fits in a strong absorption band of acetaldehyde ($CH_3CHO$), and thus measurement of acetaldehyde ($CH_3CHO$) or simultaneous measurement of formaldehyde (HCHO) and acetaldehyde ($CH_3CHO$) can be performed.

When the analysis device of the present invention measures the concentration of sulfur dioxide ($SO_2$) at a low concentration of 100 ppm or less by using the multireflection cell or the like, the analysis device calculates the concentration of the sulfur dioxide ($SO_2$) based on the absorption between 7.38 and 7.42 μm by the sulfur dioxide ($SO_2$). Here, the laser light source emits laser light at an oscillation wavelength including a wavelength of between 7.38 and 7.42 μm.

At a wavelength of between 7.38 and 7.42 μm, preferably a wavelength of between 7.385 and 7.417 μm, more preferably a wavelength of 7.3856 μm or 7.4163 μm, one of the strongest absorption lines of sulfur dioxide ($SO_2$) exists, and the absorption intensity of water ($H_2O$), methane ($CH_4$), acetylene ($C_2H_2$), and/or nitrous oxide ($N_2O$), which are interference components contained in the combustion gas, in this wavelength range, is low, and their interference influence is small. As a result, accuracy of measuring the concentration of sulfur dioxide ($SO_2$) can be improved.

When the analysis device of the present invention measures the concentration of methane ($CH_4$) at a low concentration of 100 ppm or less by using the multireflection cell or the like, the analysis device calculates the concentration of the methane ($CH_4$) based on absorption between 7.50 and 7.54 μm by the methane ($CH_4$). Here, the laser light source emits laser light at an oscillation wavelength including a wavelength of between 7.50 and 7.54 μm.

At a wavelength of between 7.50 and 7.54 μm, preferably a wavelength of between 7.503 and 7.504 μm, more preferably a wavelength of 7.5035 μm, one of the strongest absorption lines of methane ($CH_4$) exists, and the absorption intensity of sulfur dioxide ($SO_2$), acetylene ($C_2H_2$), and/or nitrous oxide ($N_2O$), which are interference components contained in the combustion gas, in this wavelength range, is low, and their interference influence is small. As a result, accuracy of measuring the concentration of methane ($CH_4$) can be improved. In addition, an absorption line of water ($H_2O$) exists in the vicinity of this wavelength, and simultaneous measurement of methane ($CH_4$) and water ($H_2O$) can be performed.

At a wavelength of between 7.50 and 7.54 μm, preferably a wavelength of between 7.535 and 7.536 μm, more preferably a wavelength of 7.5354 μm, the absorption intensity of methane ($CH_4$) is substantially equivalent to the absorption intensity at the wavelength of 7.5035 μm, and the absorption intensity of water ($H_2O$), sulfur dioxide ($SO_2$), acetylene ($C_2H_2$), and/or nitrous oxide ($N_2O$), which are interference components contained in the combustion gas, in this wavelength range, is lower, and their interference influence is smaller. As a result, accuracy of measuring the concentration of methane ($CH_4$) can be improved.

When the analysis device of the present invention measures the concentration of methanol ($CH_3OH$) or ethanol ($C_2H_5OH$) at a low concentration of 100 ppm or less by using the multireflection cell or the like, the analysis device calculates the concentration of the methanol ($CH_3OH$) or the ethanol ($C_2H_5OH$) based on absorption between 9.45 and 9.47 μm by the methanol ($CH_3OH$) or the ethanol ($C_2H_5OH$). Here, the laser light source emits laser light at an oscillation wavelength including a wavelength of between 9.45 and 9.47 μm.

At a wavelength of between 9.45 and 9.47 μm, preferably a wavelength of between 9.467 and 9.468 μm, more preferably a wavelength of 9.4671 μm, one of the strongest absorption lines of methanol ($CH_3OH$) exists, and the absorption intensity of ethylene ($C_2H_4$), ammonia ($NH_3$), and/or carbon dioxide ($CO_2$), which are interference components contained in the combustion gas, in this wavelength range, is low, and their interference influence is small. As a result, accuracy of measuring the concentration of methanol ($CH_3OH$) can be improved. In addition, this wavelength fits in a strong absorption band of ethanol ($C_2H_5OH$), and thus measurement of ethanol ($C_2H_5OH$) or simultaneous measurement of methanol ($CH_3OH$) and ethanol ($C_2H_5OH$) can be performed.

At a wavelength of between 9.45 and 9.47 μm, preferably a wavelength of between 9.455 and 9.456 μm, more preferably a wavelength of 9.4557 μm, the absorption intensity of methanol ($CH_3OH$) or ethanol ($C_2H_5OH$) is substantially equivalent to the absorption intensity at the wavelength of 9.4671 μm, and the absorption intensity of ethylene ($C_2H_4$), ammonia ($NH_3$), and/or carbon dioxide ($CO_2$), which are interference components contained in the combustion gas, in this wavelength range, is lower, and their interference influence is smaller. As a result, accuracy of measuring the concentration of methanol ($CH_3OH$) or ethanol ($C_2H_5OH$) can be improved. In addition, simultaneous measurement of methanol ($CH_3OH$) and ethanol ($C_2H_5OH$) can be performed.

Further, an analysis method according to the present invention is an analysis method of measuring a concentration of a measurement target component that is at least one of nitric oxide, nitrogen dioxide, nitrous oxide, ammonia, ethane, formaldehyde, acetaldehyde, sulfur dioxide, methane, methanol, or ethanol contained in a combustion gas. The analysis method includes: when a concentration of the nitric oxide is measured, calculating the concentration of the nitric oxide based on absorption at an absorption wavelength of between 5.24 and 5.26 μm; when a concentration of the nitrogen dioxide is measured, calculating the concentration of the nitrogen dioxide based on absorption at an absorption wavelength of between 6.14 and 6.26 μm; when a concentration of the nitrous oxide is measured, calculating the concentration of the nitrous oxide based on absorption at an absorption wavelength of between 7.84 and 7.91 μm; when a concentration of the ammonia is measured, calculating the concentration of the ammonia based on absorption at an absorption wavelength of between 9.38 and 9.56 μm; when a concentration of the ethane is measured, calculating the concentration of the ethane based on absorption at an absorption wavelength of between 3.33 and 3.36 μm; when a concentration of the formaldehyde or the acetaldehyde is measured, calculating the concentration of the formaldehyde or the acetaldehyde based on absorption at an absorption wavelength of between 5.65 and 5.67 μm; when a concentration of the sulfur dioxide is measured, calculating the concentration of the sulfur dioxide based on absorption at an absorption wavelength of between 7.38 and 7.42 μm; when a concentration of the methane is measured, calculating the concentration of the methane based on absorption at an absorption wavelength of between 7.50 and 7.54 μm; and when a concentration of the methanol or the ethanol is measured, calculating the concentration of the methanol or the ethanol based on absorption at an absorption wavelength of between 9.45 and 9.47 μm.

Advantageous Effects of Invention

According to the present invention described above, it is possible to measure with high accuracy a concentration of a measurement target component that is at least one of nitric oxide, nitrogen dioxide, nitrous oxide, ammonia, ethane, formaldehyde, acetaldehyde, sulfur dioxide, methane, methanol, or ethanol contained in a combustion gas.

BRIEF DESCRIPTION OF DRAWINGS

FIGS. 8(*a*) and 8(*b*) are lookup tables illustrating (a) wavelength correction relationship data and (b) modulation correction relationship data in the embodiment.

DESCRIPTION OF EMBODIMENTS

Figure 1:
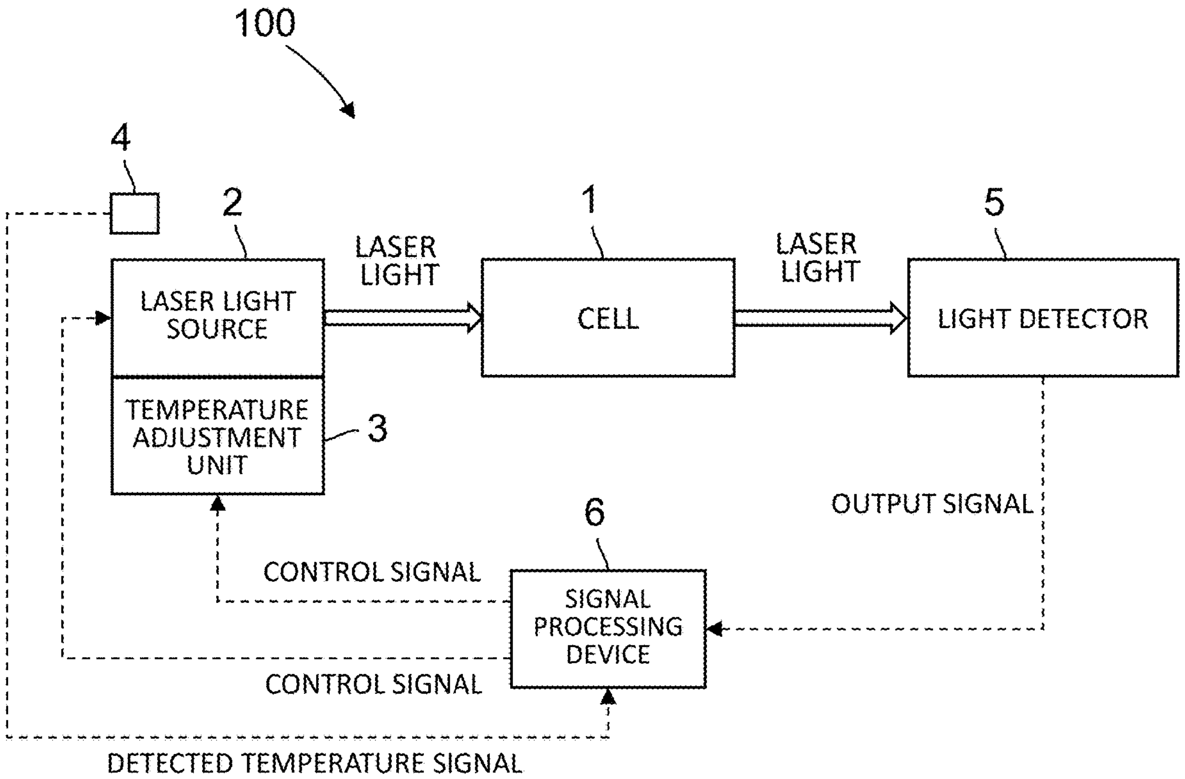
FIG. 1 is an overall schematic diagram of an analysis device according to an embodiment of the present invention.

An analysis device 100 of the present embodiment is a concentration measurement device that measures a concentration of a measurement target component contained in a sample gas that includes a combustion gas such as a combusting gas or a combusted exhaust gas, or that includes a process gas. As illustrated in FIG. 1, the analysis device 100 includes a cell 1 into which a sample gas is introduced, a semiconductor laser 2, serving as a laser light source, that irradiates the cell 1 with laser light that can be modulated, a temperature adjustment unit 3 that adjusts a temperature of the semiconductor laser 2, a temperature sensor 4 that detects an ambient temperature of the semiconductor laser 2, a light detector 5 that is provided on an optical path of sample light, which is laser light obtained when being transmitted through the cell 1, and that receives the sample light, and a signal processing device 6 that receives an output signal from the light detector 5 and that calculates the concentration of the measurement target component based on a value of the output signal. Here, the combusting gas is a gas that is combusting in an internal combustion engine of a vehicle or the like, an external combustion engine, an industrial furnace, an incinerator, a turbine, a power plant, or the like, and the combusted exhaust gas is a gas after combustion discharged from an internal combustion engine of a vehicle or the like, an external combustion engine, an industrial furnace, an incinerator, a turbine, a power plant, or the like. The process gas is a gas in a chemical plant in petrochemistry, coal chemistry, natural-gas chemistry, petroleum refining, methanation, or the like, or such as a gasification furnace, and includes a gas separated in the chemical plant, a gas generated in the chemical plant, or the like, in addition to a raw material gas such as a natural gas.

Note that an introduction flow path through which a sample gas is introduced into the analysis device 100 of the present embodiment is connected to the analysis device 100, and a discharge flow path through which a gas analyzed through the analysis device 100 is discharged is connected to the analysis device 100. The introduction flow path or the discharge flow path is provided with a pump for introducing the sample gas into the analysis device 100. The introduction flow path may be configured such that direct sampling of an exhaust gas from an exhaust pipe or the like is performed through the introduction flow path. Alternatively, the introduction flow path may be configured such that an exhaust gas from a bag in which the exhaust gas is collected is introduced through the introduction flow path. Alternatively, the introduction flow path may be configured such that an exhaust gas diluted through a dilution device such as a constant volume sampler (CVS) is introduced through the introduction flow path.

Each component will be described.

The cell 1 has a light entrance aperture and a light exit aperture formed of a transparent material such as quartz, calcium fluoride, or barium fluoride, which hardly absorbs light in an absorption wavelength band of the measurement target component. Although not illustrated, the cell 1 is provided with an inlet port for allowing a gas to be introduced into the cell 1 and an outlet port for allowing the gas in the cell 1 to be discharged, and the sample gas is introduced into the cell 1 through the inlet port.

Here, the semiconductor laser 2 is a quantum cascade laser (QCL), which is a type of the semiconductor laser 2, and oscillates laser light in a mid-infrared range (4 to 12 μm). The semiconductor laser 2 can cause an oscillation wavelength to be modulated (changed) by a current (or a voltage) provided thereto. Note that, as long as the oscillation wavelength is tunable, another type of laser may be used. In addition, to change the oscillation wavelength, any measure may be taken such as changing the temperature thereof.

The temperature adjustment unit 3 adjusts the temperature of the semiconductor laser 2, and uses, for example, a thermoelectric conversion element such as a Peltier element. The temperature adjustment unit 3 of the present embodiment has a heat absorption surface that is an upper surface thereof, on which the semiconductor laser 2 and a temperature sensor (not illustrated) for detecting the temperature of the semiconductor laser 2 are mounted, and has a heat dissipation surface that is a lower surface thereof, on which a heat sink (not illustrated), such as heat dissipation fins, is provided. The temperature adjustment unit 3 adjusts the temperature of the semiconductor laser 2 by controlling an applied DC voltage (DC current) in accordance with a target temperature from a temperature adjustment control unit 72 to be described later.

The temperature sensor 4 detects an ambient temperature of the semiconductor laser 2. Here, the temperature sensor 4 detects a temperature in an atmosphere inside a package that houses the semiconductor laser and the temperature adjustment unit 3, or an ambient temperature near the outside of the package.

Here, as the light detector 5, a thermal-type light detector such as a thermopile, which is relatively inexpensive, is used. However, another type of light detector may be used as the light detector 5, and an example thereof may be a quantum photoelectric element having excellent responsiveness such as one using HgCdTe, InGaAs, InAsSb, or PbSe.

Figure 2:
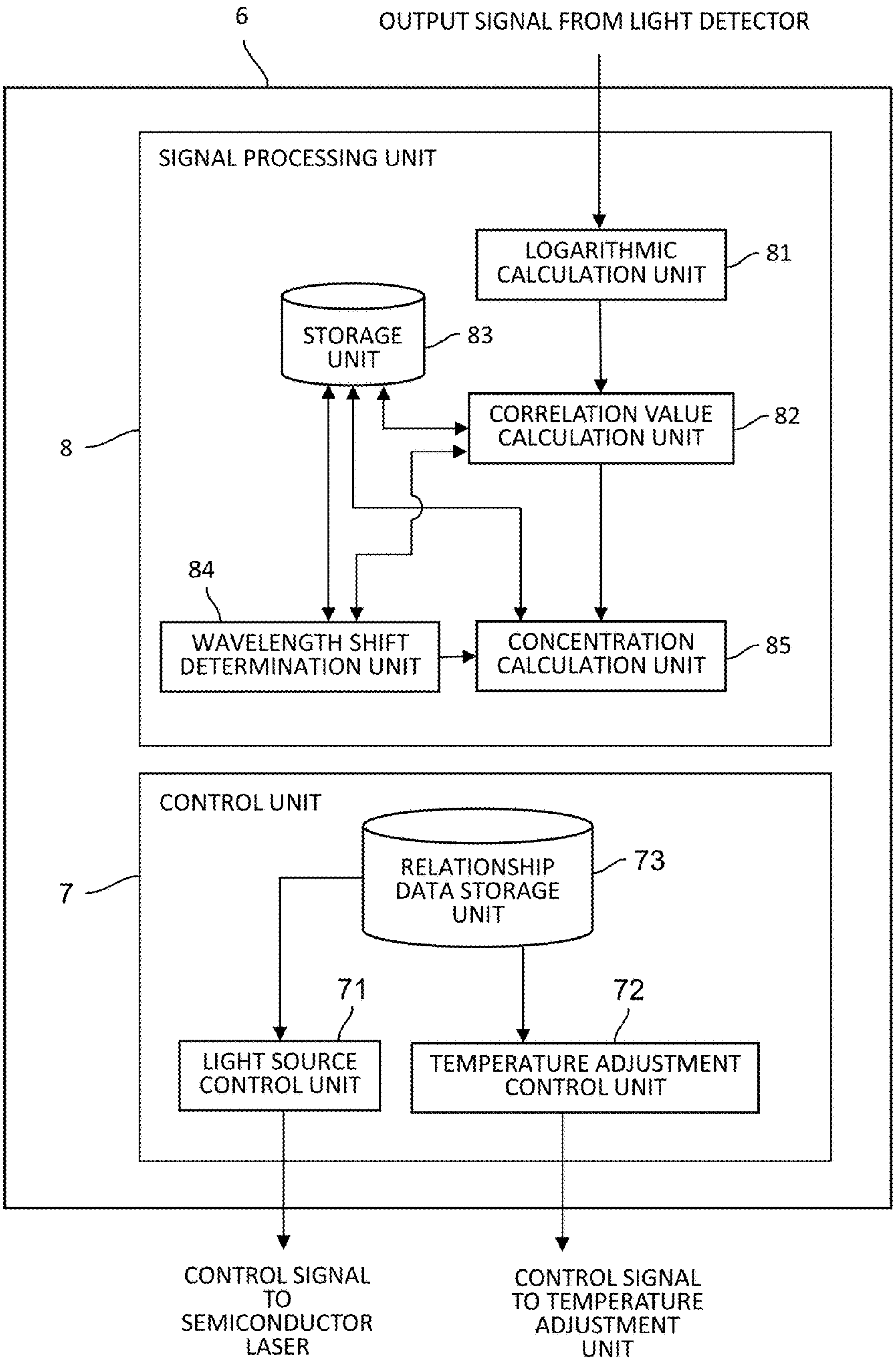
FIG. 2 is a functional block diagram of a signal processing device according to the embodiment.

The signal processing device 6 includes an analog electrical circuit including a buffer, an amplifier, and the like, a digital electrical circuit including a CPU, a memory, and the like, and at least one of an AD converter, a DA converter, or the like that interfaces between the analog electrical circuit and the digital electrical circuit. The CPU and its peripheral devices cooperate with each other in accordance with a predetermined program stored in a predetermined area of the memory, whereby the signal processing device 6 functions as a control unit 7 that controls the semiconductor laser 2 and the temperature adjustment unit 3, and as a signal processing unit 8 that receives an output signal from the light detector 5 and that executes calculation processing on a value of the output signal to calculate the concentration of the measurement target component, as illustrated in FIG. 2.

Each unit will be described in detail below.

The control unit 7 includes a light source control unit 71 that controls oscillation and a modulation width of the semiconductor laser 2, and the temperature adjustment control unit 72 that performs control to cause the temperature adjustment unit 3 to have a predetermined temperature.

Figure 3:
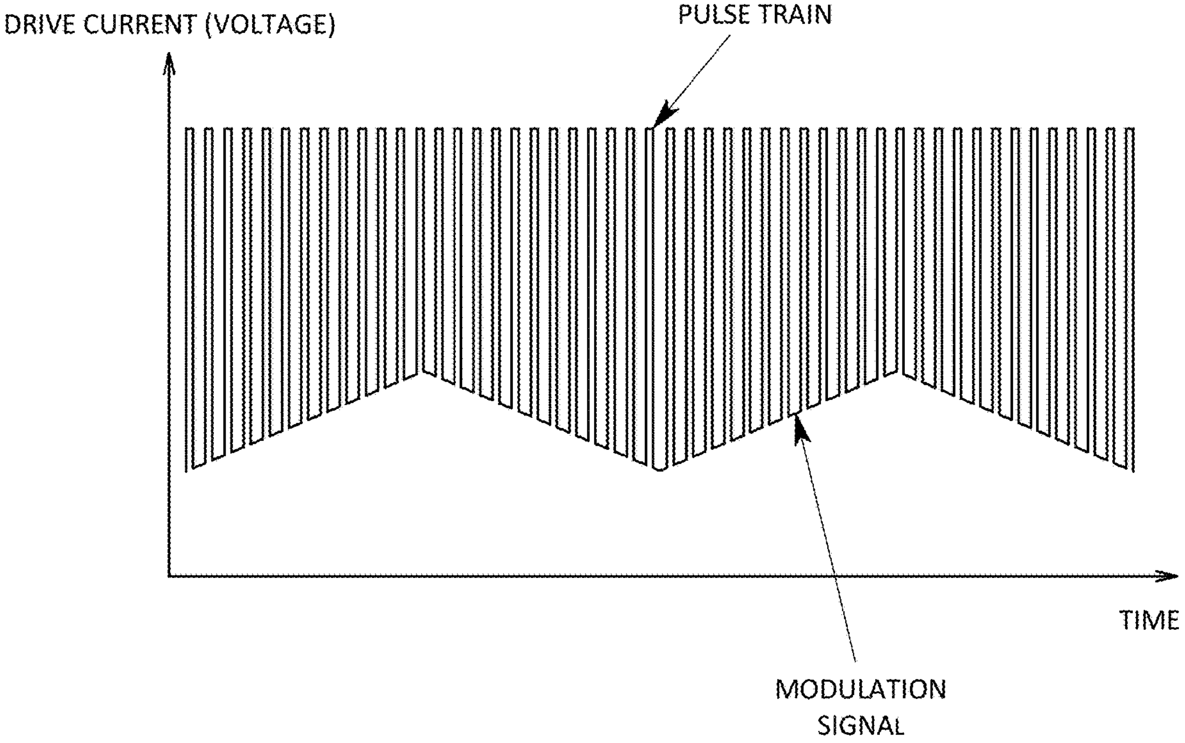
FIG. 3 is a diagram illustrating drive current (voltage) and a modulation signal in quasi-continuous oscillation.

The light source control unit 71 controls a current source (or a voltage source) that drives the semiconductor laser 2 by outputting a current (or voltage) control signal. Specifically, as illustrated in FIG. 3, the light source control unit 71 changes, at a predetermined frequency, drive current (or drive voltage) for causing wavelength modulation to occur, which is provided separately from drive current (or drive voltage) for causing the semiconductor laser 2 to generate pulse oscillation. Then, the light source control unit 71 modulates an oscillation wavelength of laser light output from the semiconductor laser 2 with respect to a center wavelength at a predetermined frequency. As a result, the semiconductor laser 2 emits modulated light modulated at a predetermined modulation frequency.

Figure 4:
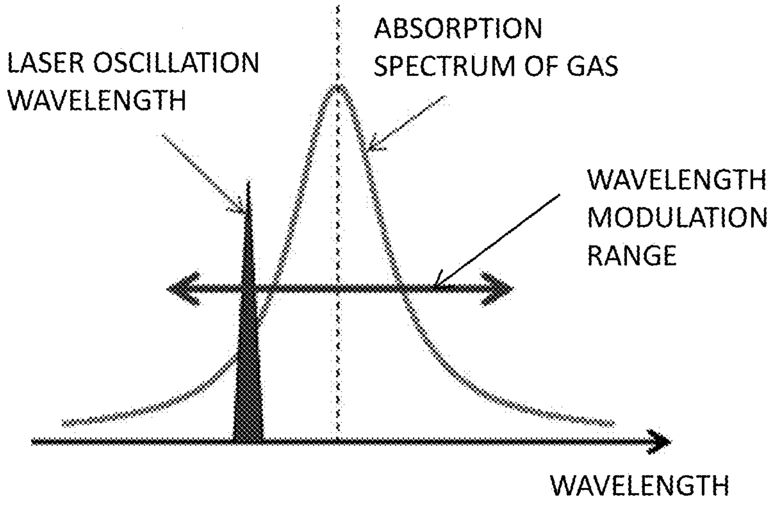
FIG. 4 is a schematic diagram illustrating a method of modulating a laser oscillation wavelength in the embodiment.
Figure 5:
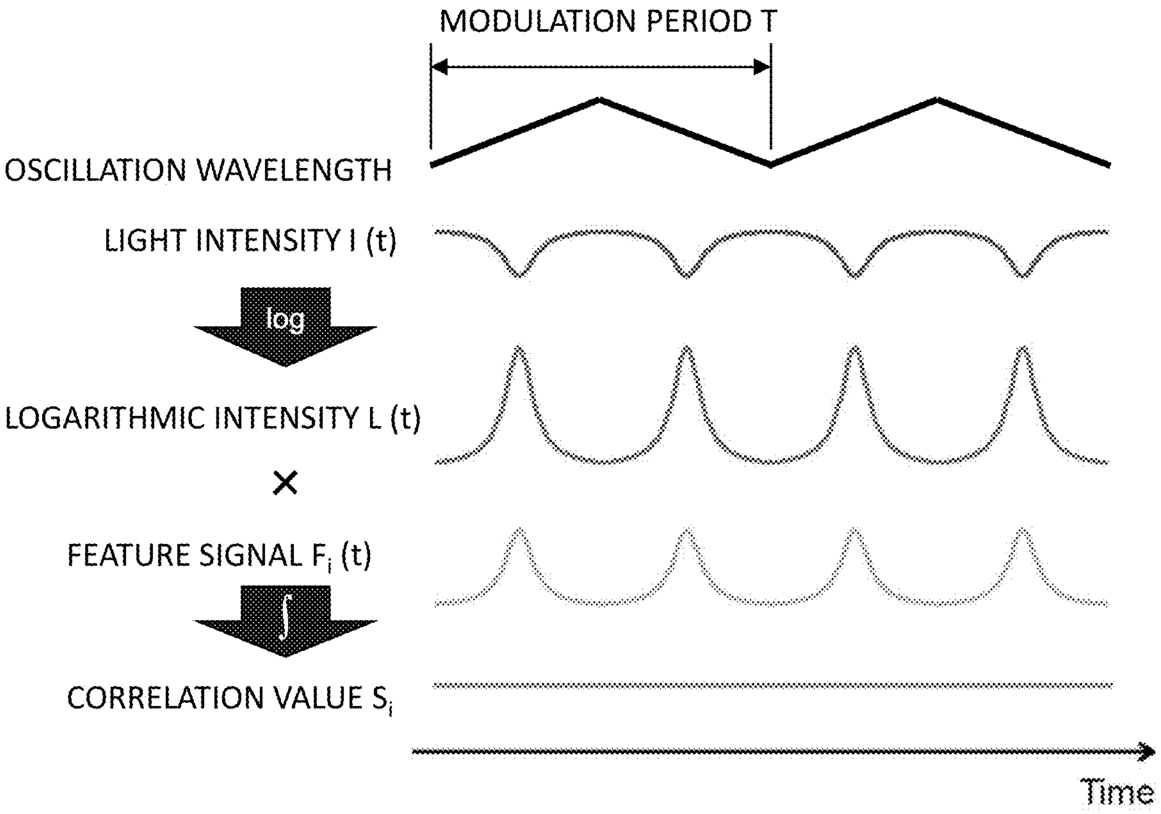
FIG. 5 is a time-series graph illustrating an example in which an oscillation wavelength, light intensity I(t), logarithmic intensity L(t), a feature signal $F_i(t)$, and a correlation value $S_i(t)$ are exemplified, in the embodiment.

In this embodiment, the light source control unit 71 changes the drive current such that a triangular waveform is formed, and modulates the oscillation wavelength such that a triangular waveform is formed (see "oscillation wavelength" in FIG. 5). Actually, the drive current is modulated by using another function such that the oscillation wavelength is formed in a triangular waveform. As illustrated in FIG. 4, the oscillation wavelength of the laser light is adapted to be modulated while the peak of a light absorption spectrum of the measurement target component is set as the center wavelength. In addition, the light source control unit 71 may change the drive current into a sinusoidal waveform, a sawtooth waveform, or any functional form, and may modulate the oscillation wavelength into a sinusoidal waveform, a sawtooth waveform, or any functional form.

Specifically, when the analysis device 100 measures the concentration of at least one of nitric oxide (NO), nitrogen dioxide ($NO_2$), nitrous oxide ($N_2O$), ammonia ($NH_3$), ethane ($C_2H_6$), formaldehyde (HCHO), acetaldehyde ($CH_3CHO$), sulfur dioxide ($SO_2$), methane ($CH_4$), methanol ($CH_3OH$), or ethanol ($C_2H_5OH$) contained in a combustion gas, the light source control unit 71 performs modulation for the semiconductor laser 2 such that the wavelength modulation range becomes each of the following wavelength modulation ranges. Note that the semiconductor laser 2 that can emit modulated light modulated in each of the following wavelength modulation ranges is appropriately selected.

In a case where the measurement target component is nitric oxide (NO) at a low concentration of 100 ppm or less, the light source control unit 71 performs modulation such that the wavelength modulation range of laser light includes a wavelength of between 5.24 and 5.26 μm. Specifically, the light source control unit 71 performs modulation such that the wavelength modulation range of the laser light includes preferably a wavelength of between 5.245 and 5.247 μm, more preferably a wavelength of 5.2462 μm. By performing modulation in this manner, the interference influence of water ($H_2O$), carbon dioxide ($CO_2$), and/or ethylene ($C_2H_4$) can be reduced, and accuracy of measuring the concentration of the nitric oxide (NO) at a low concentration can be improved.

In a case where the measurement target component is nitrogen dioxide ($NO_2$) at a low concentration of 100 ppm or less, the light source control unit 71 performs modulation such that the wavelength modulation range of the laser light includes a wavelength of between 6.14 and 6.26 μm. Specifically, the light source control unit 71 performs modulation such that the wavelength modulation range of the laser light includes preferably a wavelength of between 6.145 and 6.254 μm, more preferably a wavelength of 6.2322 μm or 6.2538 μm. By performing modulation in this manner, the interference influence of water ($H_2O$) and/or ammonia ($NH_3$) can be reduced, and accuracy of measuring the concentration of the nitrogen dioxide ($NO_2$) at a low concentration can be improved.

In a case where the measurement target component is nitrous oxide ($N_2O$) at a low concentration of 100 ppm or less, the light source control unit 71 performs modulation such that the wavelength modulation range of the laser light includes a wavelength of between 7.84 and 7.91 μm. Specifically, the light source control unit 71 performs modulation such that the wavelength modulation range of the laser light includes preferably a wavelength of between 7.845 and 7.907 μm, more preferably a wavelength of 7.8455 μm, 7.8509 μm, 7.8784 μm, or 7.9067 μm. By performing modulation in this manner, the interference influence of water ($H_2O$), methane ($CH_4$), and/or acetylene ($C_2H_2$) can be reduced, and accuracy of measuring the concentration of the nitrous oxide ($N_2O$) at a low concentration can be improved.

In a case where the measurement target component is ammonia ($NH_3$) at a low concentration of 100 ppm or less, the light source control unit 71 performs modulation such that the wavelength modulation range of the laser light includes a wavelength of between 9.38 and 9.56 μm. Specifically, the light source control unit 71 performs modulation such that the wavelength modulation range of the laser light includes preferably a wavelength of between 9.384 and 9.557 μm, more preferably a wavelength of 9.3847 μm or 9.5566 μm. By performing modulation in this manner, the interference influence of water ($H_2O$), carbon dioxide ($CO_2$), and/or ethylene ($C_2H_4$) can be reduced, and accuracy of measuring the concentration of the ammonia ($NH_3$) at a low concentration can be improved.

In a case where the measurement target component is ethane ($C_2H_6$) at a low concentration of 100 ppm or less, the light source control unit 71 performs modulation such that the wavelength modulation range of the laser light includes a wavelength of between 3.33 and 3.36 μm. Specifically, the light source control unit 71 performs modulation such that the wavelength modulation range of the laser light includes preferably a wavelength of between 3.336 and 3.352 μm, more preferably a wavelength of 3.3368 μm, 3.3482 μm, or 3.3519 μm. By performing modulation in this manner, the interference influence of water ($H_2O$), methane ($CH_4$), and/or ethylene ($C_2H_4$) can be reduced, and accuracy of measuring the concentration of the ethane ($C_2H_6$) at a low concentration can be improved.

In a case where the measurement target component is formaldehyde (HCHO) at a low concentration of 100 ppm or less, the light source control unit 71 performs modulation such that the wavelength modulation range of the laser light includes a wavelength of between 5.65 and 5.67 μm. Specifically, the light source control unit 71 performs modulation such that the wavelength modulation range of the laser light includes preferably a wavelength of between 5.651 and 5.652 μm, more preferably a wavelength of 5.6514 μm. By performing modulation in this manner, the interference influence of water ($H_2O$) and/or ammonia ($NH_3$) can be reduced, and accuracy of measuring the concentration of the formaldehyde (HCHO) at a low concentration can be improved. In addition, these wavelengths fit in a strong absorption band of acetaldehyde ($CH_3CHO$), and thus simultaneous measurement of formaldehyde (HCHO) and acetaldehyde ($CH_3CHO$) can be performed.

In addition, the light source control unit 71 can also perform modulation such that the wavelength modulation range of the laser light includes preferably a wavelength of between 5.665 and 5.667 μm, more preferably a wavelength of 5.6660 μm. Although the absorption intensity of formaldehyde (HCHO) at this wavelength is slightly lower than the absorption intensity at the wavelength of 5.6514 μm, the absorption intensity of water ($H_2O$) is further lower, and its interference influence is smaller. As a result, accuracy of measuring the concentration of formaldehyde (HCHO) can be improved. In addition, this wavelength fits in a strong absorption band of acetaldehyde ($CH_3CHO$), and thus measurement of acetaldehyde ($CH_3CHO$) or simultaneous measurement of formaldehyde (HCHO) and acetaldehyde ($CH_3CHO$) can be performed.

In a case where the measurement target component is sulfur dioxide ($SO_2$) at a low concentration of 100 ppm or less, the light source control unit 71 performs modulation such that the wavelength modulation range of the laser light includes a wavelength of between 7.38 and 7.42 μm. Specifically, the light source control unit 71 performs modulation such that the wavelength modulation range of the laser light includes preferably a wavelength of between 7.385 and 7.417 μm, more preferably a wavelength of 7.3856 μm or 7.4163 μm. By performing modulation in this manner, the interference influence of water ($H_2O$), methane ($CH_4$), acetylene ($C_2H_2$), and/or nitrous oxide ($N_2O$) can be reduced, and accuracy of measuring the concentration of the sulfur dioxide ($SO_2$) at a low concentration can be improved.

In a case where the measurement target component is methane ($CH_4$) at a low concentration of 100 ppm or less, the light source control unit 71 performs modulation such that the wavelength modulation range of the laser light includes a wavelength of between 7.50 and 7.54 μm. Specifically, the light source control unit 71 performs modulation such that the wavelength modulation range of the laser light includes preferably a wavelength of between 7.503 and 7.504 μm, more preferably a wavelength of 7.5035 μm. By performing modulation in this manner, the interference influence of water ($H_2O$), sulfur dioxide ($SO_2$), acetylene ($C_2H_2$), and/or nitrous oxide ($N_2O$) can be reduced, and accuracy of measuring the concentration of the methane ($CH_4$) at a low concentration can be improved. In addition, by performing modulation to include a wavelength of 7.5035 μm, simultaneous measurement of methane ($CH_4$) and water ($H_2O$) can be performed because an absorption line of water ($H_2O$) exists in the vicinity of this wavelength.

In addition, the light source control unit 71 can also perform modulation such that the wavelength modulation range of the laser light includes preferably a wavelength of between 7.535 and 7.536 μm, more preferably a wavelength of 7.5354 μm. At this wavelength, the absorption intensity of methane ($CH_4$) is substantially equivalent to the absorption intensity at the wavelength of 7.5035 μm, and the absorption intensity of water ($H_2O$), sulfur dioxide ($SO_2$), acetylene ($C_2H_2$), and/or nitrous oxide ($N_2O$), which are interference components contained in the combustion gas, in this wavelength range, is lower, and their interference influence is smaller. As a result, accuracy of measuring the concentration of methane ($CH_4$) can be improved.

In a case where the measurement target component is methanol ($CH_3OH$) at a low concentration of 100 ppm or less, the light source control unit 71 performs modulation such that the wavelength modulation range of the laser light includes a wavelength of between 9.45 and 9.47 μm. Specifically, the light source control unit 71 performs modulation such that the wavelength modulation range of the laser light includes preferably a wavelength of between 9.467 and 9.468 μm more preferably a wavelength of 9.4671 μm. By performing modulation in this manner, the interference influence of ethylene ($C_2H_4$), ammonia ($NH_3$), and/or carbon dioxide ($CO_2$) can be reduced, and accuracy of measuring the concentration of the methanol ($CH_3OH$) at a low concentration can be improved. In addition, these wavelengths fit in a strong absorption band of ethanol ($C_2H_5OH$), and thus simultaneous measurement of methanol ($CH_3OH$) and ethanol ($C_2H_5OH$) can be performed.

In addition, the light source control unit 71 can also perform modulation such that the wavelength modulation range of the laser light includes preferably a wavelength of between 9.455 and 9.456 μm, more preferably a wavelength of 9.4557 μm. At this wavelength, the absorption intensity of methanol ($CH_3OH$) or ethanol ($C_2H_5OH$) is substantially equivalent to the absorption intensity at the wavelength of 9.4671 μm, and the absorption intensity of ethylene ($C_2H_4$), ammonia ($NH_3$), and/or carbon dioxide ($CO_2$), which are interference components contained in the combustion gas, in this wavelength range, is lower, and their interference influence is smaller. As a result, accuracy of measuring the concentration of methanol ($CH_3OH$) or ethanol ($C_2H_5OH$) can be improved. In addition, simultaneous measurement of methanol ($CH_3OH$) and ethanol ($C_2H_5OH$) can be performed.

Further, when the analysis device 100 measures the concentration of at least one of carbon dioxide ($CO_2$), carbon monoxide (CO), ethylene ($C_2H_4$), ammonia ($NH_3$), ethane ($C_2H_6$), water ($H_2O$), acetylene ($C_2H_2$), methane ($CH_4$), ammonia ($NH_3$), or methanol ($CH_3OH$) contained in a process gas, the light source control unit 71 performs modulation for the semiconductor laser 2 such that the wavelength modulation range becomes each of the following wavelength modulation ranges.

In a case where the measurement target component is carbon dioxide ($CO_2$) at a low concentration of 100 ppm or less, the light source control unit 71 performs modulation such that the wavelength modulation range of the laser light includes a wavelength of between 4.23 and 4.24 μm. Specifically, the light source control unit 71 performs modulation such that the wavelength modulation range of the laser light includes preferably a wavelength of between 4.234 and 4.238 μm or between 4.235 and 4.238 μm, more preferably a wavelength of 4.2347 μm or 4.2371 μm. By performing modulation in this manner, the interference influence of methane ($CH_4$), ethylene ($C_2H_4$), and/or ethane ($C_2H_6$) can be reduced, and accuracy of measuring the concentration of carbon dioxide ($CO_2$) at a low concentration contained in a process gas further containing methane ($CH_4$), ethylene ($C_2H_4$), and/or ethane ($C_2H_6$) at a high concentration can be improved.

In a case where the measurement target component is carbon dioxide ($CO_2$) at a medium concentration of 100 ppm to 1%, the light source control unit 71 performs modulation such that the wavelength modulation range of the laser light includes a wavelength of between 4.34 and 4.35 μm. Specifically, the light source control unit 71 performs modulation such that the wavelength modulation range of the laser light includes preferably a wavelength of between 4.342 and 4.347 μm, more preferably a wavelength of 4.3428 μm or 4.3469 μm. By performing modulation in this manner, the interference influence of methane ($CH_4$), ethylene ($C_2H_4$), and/or ethane ($C_2H_6$) can be reduced, and accuracy of measuring the concentration of carbon dioxide ($CO_2$) at a medium concentration contained in a process gas further containing methane ($CH_4$), ethylene ($C_2H_4$), and/or ethane ($C_2H_6$) at a high concentration can be improved.

In a case where the measurement target component is carbon monoxide (CO) at a low concentration of 100 ppm or less, the light source control unit 71 performs modulation such that the wavelength modulation range of the laser light includes a wavelength of between 4.59 and 4.61 μm, or between 4.59 and 4.60 μm. Specifically, the light source control unit 71 performs modulation such that the wavelength modulation range of the laser light includes preferably a wavelength of between 4.594 and 4.604 μm, more preferably a wavelength of 4.5950 μm or 4.6024 μm. By performing modulation in this manner, the interference influence of methane ($CH_4$), ethylene ($C_2H_4$), and/or ethane ($C_2H_6$) can be reduced, and accuracy of measuring the concentration of carbon monoxide (CO) at a low concentration contained in a process gas further containing methane ($CH_4$), ethylene ($C_2H_4$), and/or ethane ($C_2H_6$) at a high concentration can be improved.

In a case where the measurement target component is water ($H_2O$) at a low concentration of 100 ppm or less, the light source control unit 71 performs modulation such that the wavelength modulation range of the laser light includes a wavelength of between 5.89 and 6.12 μm. Specifically, the light source control unit 71 performs modulation such that the wavelength modulation range of the laser light includes preferably a wavelength of between 5.896 and 5.934 μm, more preferably a wavelength of 5.8965 μm or 5.9353 μm. By performing modulation in this manner, the interference influence of methane ($CH_4$), ethylene ($C_2H_4$), and/or ethane ($C_2H_6$) can be reduced, and accuracy of measuring the concentration of water ($H_2O$) at a low concentration contained in a process gas further containing methane ($CH_4$), ethylene ($C_2H_4$), and/or ethane ($C_2H_6$) at a high concentration can be improved.

In addition, the light source control unit 71 can also perform modulation such that the wavelength modulation range of the laser light includes preferably a wavelength of between 6.046 and 6.114 μm, more preferably a wavelength of 6.0486 μm or 6.1138 μm. By performing modulation in this manner, the interference influence of methane ($CH_4$), ethylene ($C_2H_4$), and/or ethane ($C_2H_6$) can be reduced, and accuracy of measuring the concentration of water ($H_2O$) at a low concentration contained in the process gas further containing methane ($CH_4$), ethylene ($C_2H_4$), and/or ethane ($C_2H_6$) at a high concentration can be improved.

In a case where the measurement target component is acetylene ($C_2H_2$) at a low concentration of 100 ppm or less, the light source control unit 71 performs modulation such that the wavelength modulation range of the laser light includes a wavelength of between 7.56 and 7.66 μm, between 7.27 and 7.81 μm, between 7.27 and 7.24 μm, or between 7.25 and 7.81 μm. Specifically, the light source control unit 71 performs modulation such that the wavelength modulation range of the laser light includes preferably a wavelength of between 7.378 and 7.638 μm, between 7.378 and 7.603 μm, between 7.378 and 7.420 μm, between 7.430 and 7.603 μm, between 7.430 and 7.638 μm, between 7.629 and 7.683 μm, or between 7.594 and 7.651 μm, more preferably a wavelength of 7.5966 μm, 7.6233 μm, or 7.6501 μm. By performing modulation in this manner, the interference influence of methane ($CH_4$), ethylene ($C_2H_4$), and/or ethane ($C_2H_6$) can be reduced, and accuracy of measuring the concentration of acetylene ($C_2H_2$) at a low concentration contained in a process gas further containing methane ($CH_4$), ethylene ($C_2H_4$), and/or ethane ($C_2H_6$) at a high concentration can be improved.

In addition, the light source control unit 71 can also perform modulation such that the wavelength modulation range of the laser light includes preferably a wavelength of between 7.566 and 7.634 μm, more preferably a wavelength of 7.5698 μm, 7.6231 μm, or 7.6367 μm. By performing modulation in this manner, the interference influence of methane ($CH_4$), ethylene ($C_2H_4$), and/or ethane ($C_2H_6$) can be reduced, and accuracy of measuring the concentration of acetylene ($C_2H_2$) at a low concentration contained in the process gas further containing methane ($CH_4$), ethylene ($C_2H_4$), and/or ethane ($C_2H_6$) at a high concentration can be improved.

In a case where the measurement target component is methane ($CH_4$) at a low concentration of 100 ppm or less, the light source control unit 71 performs modulation such that the wavelength modulation range of the laser light includes a wavelength of between 7.67 and 7.80 μm. Specifically, the light source control unit 71 performs modulation such that the wavelength modulation range of the laser light includes preferably a wavelength of between 7.670 and 7.792 μm, more preferably a wavelength of 7.6704 μm or 7.7914 μm. By performing modulation in this manner, the interference influence of ethylene ($C_2H_4$) and/or ethane ($C_2H_6$) can be reduced, and accuracy of measuring the concentration of methane ($CH_4$) at a low concentration contained in a process gas further containing ethylene ($C_2H_4$) and/or ethane ($C_2H_6$) at a high concentration can be improved.

In a case where the measurement target component is methane ($CH_4$) at a medium concentration of 100 ppm to 1%, the light source control unit 71 performs modulation such that the wavelength modulation range of the laser light includes a wavelength of between 8.10 and 8.14 μm. Specifically, the light source control unit 71 performs modulation such that the wavelength modulation range of the laser light includes preferably a wavelength of between 8.107 and 8.139 μm, more preferably a wavelength of 8.1073 μm or 8.1381 μm. By performing modulation in this manner, the interference influence of ethylene ($C_2H_4$) and/or ethane ($C_2H_6$) can be reduced, and accuracy of measuring the concentration of methane ($CH_4$) at a medium concentration contained in a process gas further containing ethylene ($C_2H_4$) and/or ethane ($C_2H_6$) at a high concentration can be improved.

In a case where the measurement target component is methane ($CH_4$) at a high concentration of 1% or more, the light source control unit 71 performs modulation such that the wavelength modulation range of the laser light includes a wavelength of between 8.10 and 8.13 μm. Specifically, the light source control unit 71 performs modulation such that the wavelength modulation range of the laser light includes preferably a wavelength of between 8.102 and 8.121 μm, more preferably a wavelength of 8.1022 μm or 8.1206 μm. By performing modulation in this manner, the interference influence of ethylene ($C_2H_4$) and/or ethane ($C_2H_6$) can be reduced, and accuracy of measuring the concentration of methane ($CH_4$) at a high concentration contained in a process gas further containing ethylene ($C_2H_4$) and/or ethane ($C_2H_6$) at a high concentration can be improved.

In a case where the measurement target component is methane ($CH_4$) at a high concentration of 1% or more, the light source control unit 71 performs modulation such that the wavelength modulation range of the laser light includes a wavelength of between 8.10 and 8.13 μm. Specifically, the light source control unit 71 performs modulation such that the wavelength modulation range of the laser light includes a wavelength of 8.1022 μm or 8.1206 μm. By performing modulation in this manner, the interference influence of ethylene ($C_2H_4$) and/or ethane ($C_2H_6$) can be reduced, and accuracy of measuring the concentration of methane ($CH_4$) at a high concentration contained in the process gas further containing ethylene ($C_2H_4$) and/or ethane ($C_2H_6$) at a high concentration can be improved.

In a case where the measurement target component is ethylene ($C_2H_4$) at a high concentration of 1% or more, the light source control unit 71 performs modulation such that the wavelength modulation range of the laser light includes a wavelength of between 8.46 and 8.60 μm. Specifically, the light source control unit 71 performs modulation such that the wavelength modulation range of the laser light includes preferably a wavelength of between 8.464 and 8.599 μm, more preferably a wavelength of 8.4647 μm or 8.5981 μm. By performing modulation in this manner, the interference influence of methane ($CH_4$) and/or ethane ($C_2H_6$) can be reduced, and accuracy of measuring the concentration of ethylene ($C_2H_4$) at high concentration contained in a process gas further containing methane ($CH_4$) and/or ethane ($C_2H_6$) at a high concentration can be improved.

In a case where the measurement target component is ethane ($C_2H_6$) at a high concentration of 1% or more, the light source control unit 71 performs modulation such that the wavelength modulation range of the laser light includes a wavelength of between 6.13 and 6.14 μm, between 6.09 and 6.45 μm, between 6.09 and 6.39 μm, or between 6.41 and 6.45 μm. Specifically, the light source control unit 71 performs modulation such that the wavelength modulation range of the laser light includes preferably a wavelength of between 6.135 and 6.139 μm, or between 6.463 and 6.619 μm, more preferably a wavelength of 6.1384 μm, 6.4673 μm, 6.5008 μm, 6.5624 μm, or 6.6145 μm. By performing modulation in this manner, the interference influence of methane ($CH_4$) and/or ethylene ($C_2H_4$) can be reduced, and accuracy of measuring the concentration of ethane ($C_2H_6$) at a high concentration contained in a process gas further containing methane ($CH_4$) and/or ethylene ($C_2H_4$) at a high concentration can be improved.

In a case where the measurement target component is ammonia ($NH_3$) at a medium concentration of 100 ppm to 200 ppm or at a low concentration of 100 ppm or less, the light source control unit 71 performs modulation such that the wavelength modulation range of the laser light includes a wavelength of between 6.06 and 6.25 μm, between 6.06 and 6.14 μm, between 6.15 and 6.17 μm, between 6.19 and 6.25 μm, or between 8.62 and 9.09 μm. Specifically, the light source control unit 71 performs modulation such that the wavelength modulation range of the laser light includes preferably a wavelength of between 6.141 and 6.153 μm, between 6.141 and 6.149 μm, between 6.150 and 6.153 μm, or between 8.939 and 8.968 μm, more preferably a wavelength of 6.1450 μm, 6.1487 μm, 6.1496 μm, 8.9604 μm, 8.9473 μm, or 8.7671 μm. By performing modulation in this manner, the interference influence of methane ($CH_4$) and/or ethylene ($C_2H_4$) can be reduced, and accuracy of measuring the concentration of ammonia ($NH_3$) at a medium concentration or at a low concentration contained in a process gas further containing methane ($CH_4$) and/or ethylene ($C_2H_4$) at a high concentration can be improved.

In a case where the measurement target component is methanol ($CH_3OH$) at a high concentration or less of 1% or less, the light source control unit 71 performs modulation such that the wavelength modulation range of the laser light includes a wavelength of between 9.35 and 9.62 μm. Specifically, the light source control unit 71 performs modulation such that the wavelength modulation range of the laser light includes preferably a wavelength of between 9.477 and 9.526 μm, more preferably a wavelength of 9.5168 μm, 9.5042 μm, or 9.4861 μm. By performing modulation in this manner, the interference influence of ethylene ($C_2H_4$), ammonia ($NH_3$), and/or carbon dioxide ($CO_2$) can be reduced, and accuracy of measuring the concentration of methanol ($CH_3OH$) at a low concentration can be improved. Note that, when methanol is measured, it is necessary to reduce a pressure inside the cell 1 to 15 kPa or less.

The temperature adjustment control unit 72 controls a current source (or a voltage source) of the temperature adjustment unit 3 by outputting a control signal for setting the temperature of the temperature adjustment unit 3 to a predetermined target temperature. As a result, the temperature adjustment unit 3 adjusts the temperature of the semiconductor laser 2 to the predetermined target temperature.

Figure 6:
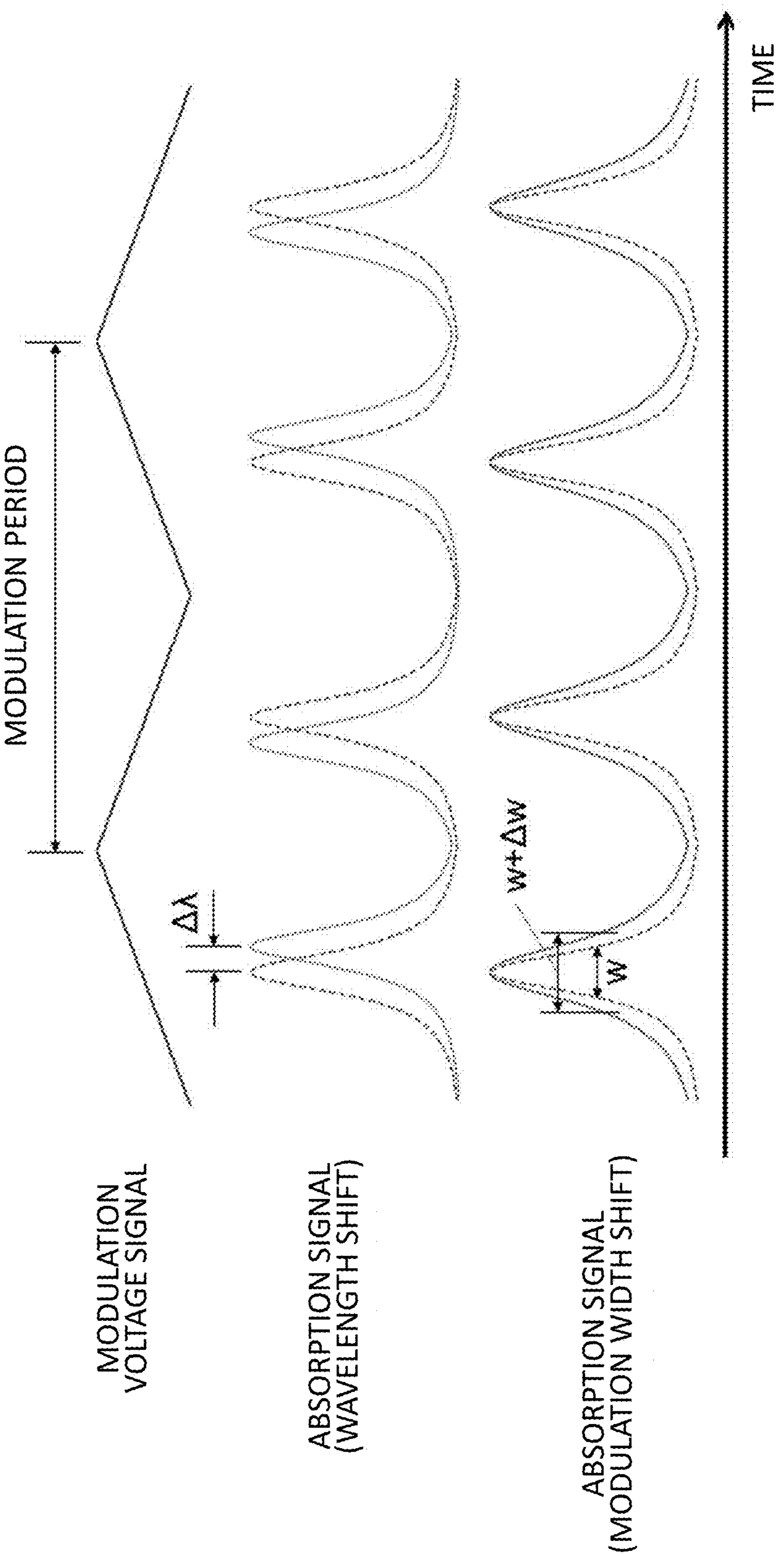
FIG. 6 is a diagram illustrating a wavelength shift and a modulation width shift in an intensity-related signal (absorption signal).

The control unit 7 of the present embodiment includes a relationship data storage unit 73 that stores wavelength correction relationship data and modulation correction relationship data. The wavelength correction relationship data indicates the relationship between the ambient temperature of the semiconductor laser 2 and a correction parameter $P(\Delta\lambda)$ (see FIG. 6), where the correction parameter $P(\Delta\lambda)$ is a parameter for correcting a wavelength shift of the semiconductor laser 2 with respect to a target wavelength for measuring the measurement target component. The modulation correction relationship data indicates the relationship between the ambient temperature of the semiconductor laser 2 and a correction parameter $P(\Delta w)$ (see FIG. 6), where the correction parameter $P(\Delta w)$ is a parameter for correcting a modulation width shift of the semiconductor laser 2.

Figure 7:
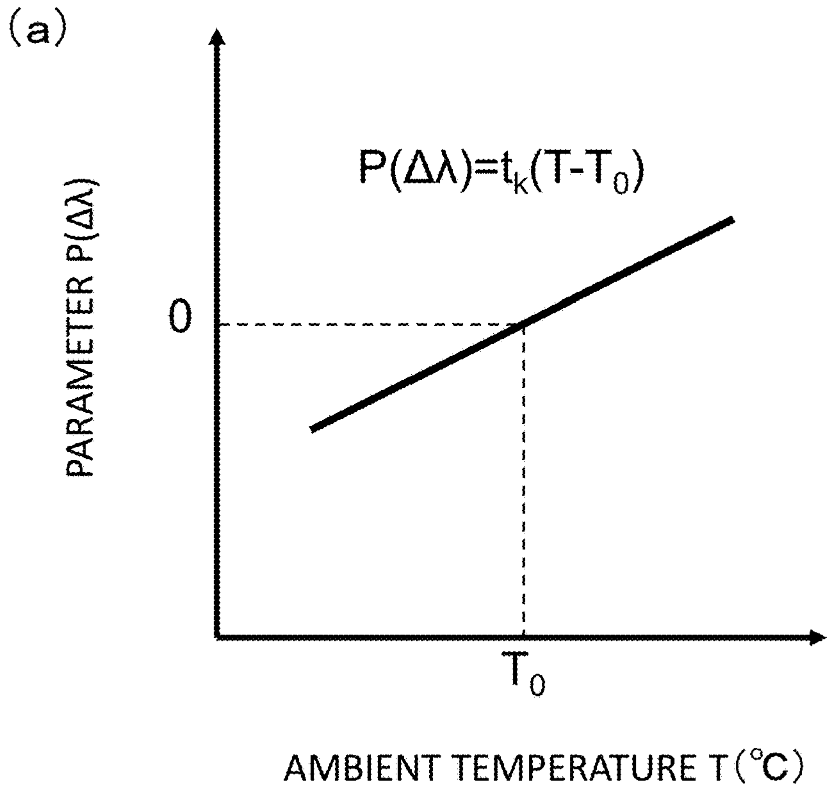
FIGS. 7(*a*) and 7(*b*) are graphs illustrating (a) wavelength correction relationship data and (b) modulation correction relationship data in the embodiment.
Figure 7:
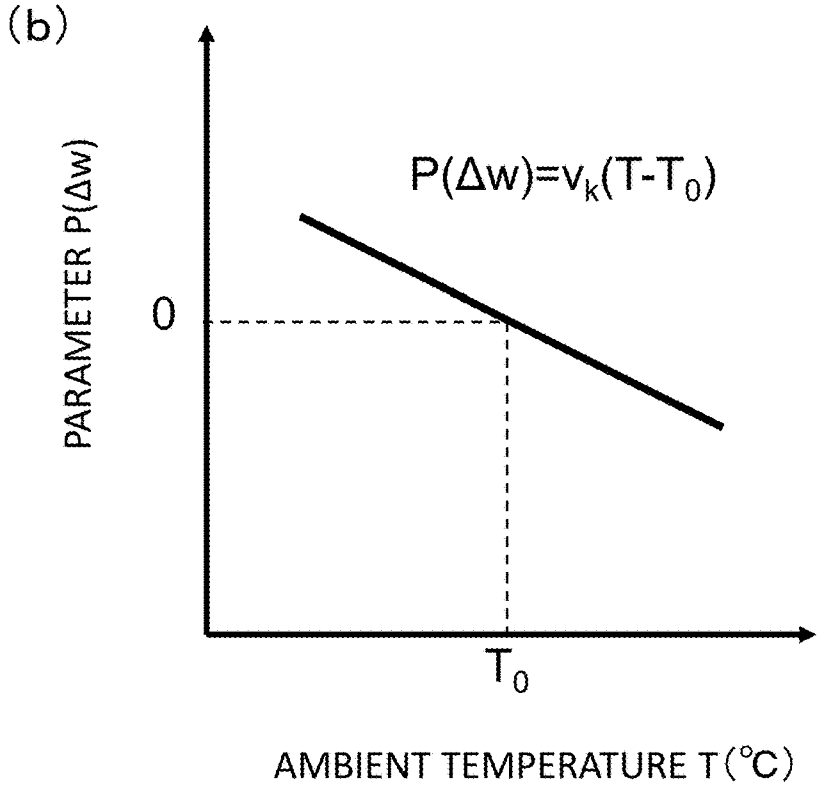

Here, the wavelength correction relationship data is illustrated in FIG. 7(*a*), and is generated in advance by obtaining, in advance through experiment or calculation, an amount of change in the target temperature, which is a parameter P (A) necessary for correcting the wavelength shift of the semiconductor laser 2, for each ambient temperature of the semiconductor laser 2. In FIG. 7(*a*), $P(\Delta\lambda)$ is the amount of change in the target temperature, $T_0$ is a reference temperature (for example, a room temperature (25° C.)), and $t_k$ is a coefficient indicating a degree of influence of the amount of change in the target temperature at the ambient temperature T with respect to the reference temperature $T_0$. The wavelength correction relationship data may be organized in an equation format as illustrated in FIG. 7(*a*), or may be organized in a lookup table format as illustrated in FIG. 8(*a*).

In addition, the modulation correction relationship data is illustrated in FIG. 7(*b*), and is generated in advance by obtaining, in advance through experiment or calculation, an amount of change in the drive voltage (current), which is a parameter $P(\Delta w)$ necessary for correcting the modulation width shift of the semiconductor laser 2, for each ambient temperature of the semiconductor laser 2. In FIG. 7(*b*), $P(\Delta w)$ is the amount of change in the drive voltage (current), $T_0$ is the reference temperature (for example, the room temperature (25° C.)), and $v_k$ is a coefficient indicating a degree of influence of the amount of change in the drive voltage (current) at the ambient temperature T with respect to the reference temperature $T_0$. The modulation correction relationship data may be organized in an equation format as illustrated in FIG. 7(*b*), or may be organized in a lookup table format as illustrated in FIG. 8(*b*).

In addition, the temperature adjustment control unit 72 corrects the wavelength shift of the semiconductor laser 2 by changing the target temperature of the temperature adjustment unit 3 using a detected temperature acquired by the temperature sensor 4 and the wavelength correction relationship data. In addition, the light source control unit 71 corrects the modulation width of the semiconductor laser 2 by changing the drive voltage or the drive current for the semiconductor laser 2 using a detected temperature acquired by the temperature sensor 4 and the modulation correction relationship data. Specifically, the light source control unit 71 corrects the modulation width by adjusting amplitude or offset of modulation voltage (modulation current) for modulating a wavelength.

The signal processing unit 8 includes a logarithmic calculation unit 81, a correlation value calculation unit 82, a storage unit 83, a wavelength shift determination unit 84, a concentration calculation unit 85, and the like.

The logarithmic calculation unit 81 performs logarithmic calculation on a light intensity signal, which is an output signal from the light detector 5. A function I(t) indicating change with time of the light intensity signal obtained by the light detector 5 is expressed as "light intensity I(t)" in FIG. 5, and is converted into "logarithmic intensity L(t)" in FIG. 5 by performing the logarithmic calculation.

The correlation value calculation unit 82 calculates a correlation value between an intensity-related signal related to the intensity of sample light and each of a plurality of predetermined feature signals. The feature signal is a signal for extracting a waveform feature of the intensity-related signal by correlating with the intensity-related signal. As the feature signal, for example, a sinusoidal wave signal, or each of other various signals corresponding to waveform features to be extracted from the intensity-related signal can be used.

An example will be described below that is a case where signals other than sinusoidal wave signals are used as the feature signals. The correlation value calculation unit 82 calculates correlation values between an intensity-related signal related to the intensity of sample light and a plurality of feature signals with which correlations different from a correlation obtained from a sinusoidal wave signal (sine function) are obtained with respect to the intensity-related signal. Here, the correlation value calculation unit 82 uses, as the intensity-related signal, a logarithmically calculated, light intensity signal (logarithmic intensity L(t)).

The correlation value calculation unit 82 calculates a plurality of sample correlation values $S_i$, which are correlation values between an intensity-related signal of sample light and a plurality of feature signals, by using the following equation (Formula 1), while using the feature signals $F_i(t)$ (i=1, 2, . . . , n), the number of which is equal to or larger than the sum of the number of types of measurement target components and the number of types of interference components whose interference influence is to be removed. Note that T in the following equations (Formula 1) is a modulation period.

[Formula 1]

$$S_i = \int_{-T/2}^{T/2} L(t)\cdot F_i(t)\,dt \quad (i = 1, 2, \ldots , n)$$

$$R_i = \int_{-T/2}^{T/2} L_0(t)\cdot F_i(t)\,dt \quad (i = 1, 2, \ldots , n)$$

When the correlation value calculation unit 82 calculates the sample correlation values, the correlation value calculation unit 82 desirably calculates sample correlation values $S'_i$ on which correction is performed by subtracting reference correlation values $R_i$, which are correlation values between an intensity-related signal $L_0(t)$ of reference light and the plurality of feature signals $F_i(t)$, from the correlation values $S_i$ between the intensity-related signal L(t) of the sample light and the plurality of feature signals $F_i(t)$ as in the equations (Formula 1). As a result, offsets included in the sample correlation values are removed, and thus the sample correlation values become correlation values proportional to the concentrations of the measurement target component and the interference component. Therefore, the measurement error can be reduced. Note that a configuration may be adopted in which the reference correlation value is not subtracted.

Here, the timing at which the reference light is obtained is a timing simultaneous with the timing at which the sample light is obtained, a timing before or after measurement, or any timing. The intensity-related signal or the reference correlation value of the reference light may be obtained in advance and stored in the storage unit 83. As a method for simultaneously obtaining the reference light, for example, it is conceivable that two light detectors 5 are provided while modulated light from the semiconductor laser 2 is split by using a beam splitter or the like, to use one of the light detectors 5 for measuring the sample light and use the other one for measuring the reference light.

In the present embodiment, the correlation value calculation unit 82 uses, as the plurality of feature signals $F_i(t)$, functions that capture a waveform feature of the logarithmic intensity L(t) more easily than a sine function. There may be a case in which it is desired to further correct the influence of the wavelength shift of reference light, for a sample gas including a measurement target component and a single interference component. In this case, it is conceivable to use three feature signals $F_1(t)$, $F_2(t)$, $F_3(t)$. As the three feature signals, for example, it is conceivable to use functions based on the Lorentzian function that is close to the form of the absorption spectrum, and a partial differential function in which the function based on the Lorentzian function is partially differentiated with respect to a shift from a reference time position, as illustrated in the following equations (Formula 2). In the equations (Formula 2), w is a Lorentzian width, s is a shift of an absorption peak from the reference time position due to a wavelength shift, A is any constant, and $A_1$, $A_2$, $A_3$ are offsets for respectively adjusting $F_1(t)$, $F_2(t)$, $F_3(t)$ to zero when $F_1(t)$, $F_2(t)$, $F_3(t)$ are integrated over the modulation period. When such functions are used as the feature signals, spectral change due to the influence of the wavelength shift of the reference light can be captured with higher sensitivity, and the influence of the wavelength shift of the reference light can be corrected with higher accuracy. As the feature signal, instead of using the function based on the Lorentzian function, a function based on the Voigt function, a function based on the Gaussian function, or the like can also be used. By using such functions for the feature signals, it is possible to obtain a correlation value larger than the correlation value obtained when the sine function is used, thereby improving accuracy of measurement.

[Formula 2]

$$F_1(t) = \frac{A}{1+\left(\frac{|t|-s_1}{w_1}\right)^2} - A_1 \left(-\frac{T}{2} \le t \le \frac{T}{2}\right)$$

$$F_2(t) = \frac{A}{1+\left(\frac{|t|-s_2}{w_2}\right)^2} - A_2 \left(-\frac{T}{2} \le t \le \frac{T}{2}\right)$$

$$F_3(t) = \frac{\partial F_1}{\partial s_1} - A_3 \left(-\frac{T}{2} \le t \le \frac{T}{2}\right)$$

The storage unit 83 stores a single-presence correlation value that is a correlation value, per unit concentration, of each of the measurement target component and the interference components. The single-presence correlation value is obtained from each intensity-related signal obtained in a case where a corresponding one of the measurement target component and the interference components is present singly, at a known wavelength shift amount of reference light, and is obtained from each of a plurality of feature signals $F_i(t)$. The plurality of feature signals $F_i(t)$ used to obtain the single-presence correlation value is the same as the plurality of feature signals $F_i(t)$ used in the correlation value calculation unit 82. As described above, the storage unit 83 stores the single-presence correlation value for each of wavelength shifts of various pieces of reference light.

Here, when the storage unit 83 stores the single-presence correlation value, the storage unit 83 desirably stores a single-presence correlation value on which correction is performed by subtracting the reference correlation value from the correlation value obtained in a case where each of the measurement target component and the interference components is present singly, and then by converting it into a single-presence correlation value per unit concentration. As a result, offsets included in the single-presence correlation values are removed, and thus the single-presence correlation values become correlation values proportional to the concentrations of the measurement target component and the interference component. Therefore, the measurement error can be reduced. Note that a configuration may be adopted in which the reference correlation value is not subtracted.

The wavelength shift determination unit 84 determines a wavelength shift amount W of reference light from the light intensity signal, which is an output signal from the light detector 5.

As a method of determining the wavelength shift amount W, for example, each of the following procedures is conceivable.

(a) The wavelength shift W of reference light is determined by comparison and matching. That is, first, respective single-presence correlation values $s_{itar}(W_k)$, $s_{iint}(W_k)$ of the measurement target component and the interference component, corresponding to the feature signals $F_i(t)$, at the wavelength shift $W_k$ (k=1, 2, . . . , l) of each piece of reference light, are obtained in advance. Then, sample correlation values obtained at the time of measurement are subjected to comparison and matching with the single-presence correlation values to determine the wavelength shift W of the reference light. A specific comparison and matching method is, for example, a non-linear least squares method involving iterative calculation using a steepest descent method, a Gauss-Newton method, a Levenberg-Marquardt method, or the like. In the case of this method, the number of necessary feature signals is equal to or larger than the number obtained by adding one to the sum of the number of types of measurement target components and the number of types of interference components. The one is added in order to respond to the wavelength shift amount, which is a parameter common to the light absorption spectra of the respective components.

(b) The wavelength shift amount W of reference light is determined by using relationship data indicating the relationship between an ambient temperature and the wavelength shift amount W, and a measured ambient temperature. At this time, the relationship data is generated in advance by obtaining the wavelength shift W of reference light for each ambient temperature of the laser light source 2 through experiment or calculation.

The concentration calculation unit 85 calculates the concentration of the measurement target component by using the plurality of sample correlation values obtained by the correlation value calculation unit 82.

Specifically, the concentration calculation unit 85 calculates the concentration of the measurement target component, based on the plurality of sample correlation values obtained by the correlation value calculation unit 82, the wavelength shift amount W determined by the wavelength shift determination unit 84, and the plurality of single-presence correlation values stored in the storage unit 83. More specifically, the concentration calculation unit 85 corrects the plurality of single-presence correlation values stored in the storage unit 83 based on the wavelength shift amount W obtained by the wavelength shift determination unit 84, to obtain a plurality of corrected single-presence correlation values. Then, the concentration calculation unit 85 calculates the concentration of the measurement target component by solving simultaneous equations including the plurality of sample correlation values obtained by the correlation value calculation unit 82, the plurality of corrected single-presence correlation values corresponding to the determined wavelength shift amount W, and the concentrations of the measurement target component and each interference component (see FIG. 9).

Next, an example of operation of the analysis device 100 will be described in combination with detailed description of the components and the units described above. Hereinafter, it is assumed that a single measurement target component and a single interference component are contained in a sample gas.

<Reference Measurement>

In a state where the ambient temperature is constant at the reference temperature $T_0$ (for example, the room temperature 25° C.), first, the light source control unit 71 controls the semiconductor laser 2 to modulate the wavelength of laser light at a predetermined modulation frequency and modulation depth, around the peak of the absorption spectrum of the measurement target component. Note that, before the reference measurement using a span gas, reference measurement using a zero gas may be performed to measure the reference correlation value.

Next, a span gas (a gas having a known component concentration) is introduced into the cell 1 by an operator or automatically, and then the reference measurement is performed. This reference measurement is performed for each of a span gas in which the measurement target component is present singly and a span gas in which the interference component is present singly.

Specifically, in the reference measurement, the logarithmic calculation unit 81 calculates the logarithmic intensity L(t) by receiving each output signal from the light detector 5 at a corresponding one of the wavelength shift amounts of reference light. Then, the correlation value calculation unit 82 calculates a correlation value between the logarithmic intensity L(t) and each of the three feature signals $F_1(t)$, $F_2(t)$, $F_3(t)$. Then, the correlation value calculation unit 82 subtracts a reference correlation value from the correlation value, and then divides the value obtained by the subtraction by the concentration of the span gas, thereby calculating a single-presence correlation value, which is a correlation value per unit concentration of each span gas. Note that, instead of calculating the single-presence correlation value, the relationship between the concentration of a span gas and the correlation value of the span gas may be stored.

Specific description is as follows.

By adjusting the wavelength shift amount of the reference light to $w_k$ and introducing a span gas in which the measurement target component is present singly into the cell 1, the correlation value calculation unit 82 calculates correlation values $S_{1tar}(w_k)$, $S_{2tar}(w_k)$, $S_{3tar}(W_k)$ of the measurement target component. Here, $S_{1tar}(w_k)$ is a correlation value with a first feature signal, $S_{2tar}(W_k)$ is a correlation value with a second feature signal, and $S_{3tar}(W_k)$ is a correlation value with a third feature signal. Then, the correlation value calculation unit 82 calculates single-presence correlation values $s_{1tar}(w_k)$, $s_{2tar}(w_k)$, $S_{3tar}(w_k)$ by subtracting the reference correlation values $R_i$ from the correlation values $S_{itar}(w_k)$, $S_{2tar}(w_k)$, $S_{3tar}(w_k)$, and then by dividing the values obtained by the subtraction by a span gas concentration $c_{tar}$ of the measurement target component. This procedure is performed for each wavelength shift amount while the wavelength shift amount of the reference light is sequentially changed (for example, every 0.001 $cm^{-1}$ between-0.01 $cm^{-1}$ and +0.01 $cm^{-1}$) by using a method such as changing a set temperature of the semiconductor laser 2. Then, the relationship between the single-presence correlation value and the wavelength shift amount, at each obtained wavelength shift amount, is stored. Note that the span gas concentration $c_{tar}$ of the measurement target component is input to the signal processing unit 8 in advance by a user or the like.

Further, by adjusting the wavelength shift amount of the reference light to $w_k$ and introducing a span gas in which the interference component is present singly into the cell 1, the correlation value calculation unit 82 calculates correlation values $S_{1int}(w_k)$, $S_{2int}(w_k)$, $S_{3int}(w_k)$ of the interference component. Here, Stint $(W_k)$ is a correlation value with the first feature signal, $S_{2int}(w_k)$ is a correlation value with the second feature signal, and $S_{3int}(w_k)$ is a correlation value with the third feature signal. Then, the correlation value calculation unit 82 calculates single-presence correlation values $s_{1int}(W_k)$, $S_{2int}(w_k)$, $S_{3int}(w_k)$ by subtracting the reference correlation values $R_i$ from the correlation values $S_{1int}(w_k)$, $S_{2int}(w_k)$, $S_{3int}(w_k)$, and then by dividing the values obtained by the subtraction by a span gas concentration $c_{int}$ of the interference component. This procedure is performed for each wavelength shift amount while the wavelength shift amount of the reference light is sequentially changed (for example, every 0.001 $cm^{-1}$ between-0.01 $cm^{-1}$ and +0.01 $cm^{-1}$) by using a method such as changing a set temperature of the semiconductor laser 2. Then, the relationship between the single-presence correlation value and the wavelength shift amount, at each obtained wavelength shift amount, is stored. Note that the span gas concentration $c_{int}$ of the interference component is input to the signal processing unit 8 in advance by a user or the like.

The single-presence correlation values $s_{1tar}(w_k)$, $s_{2tar}(w_k)$, $s_{3tar}(w_k)$, $s_{1int}(w_k)$, $s_{2int}(w_k)$, $s_{3int}(w_k)$ at each of wavelength shift amounts $w_k$ of the pieces of reference light calculated as described above are stored in the storage unit 83. Note that the reference measurement may be performed before product shipment, or may be performed periodically.

<Sample Measurement>

The light source control unit 71 controls the semiconductor laser 2 to modulate the wavelength of laser light at a predetermined modulation frequency and modulation depth, around the peak of the absorption spectrum of the measurement target component. Here, the temperature adjustment control unit 72 corrects the wavelength shift of the semiconductor laser 2 by changing the target temperature of the temperature adjustment unit 3 using a detected temperature acquired by the temperature sensor 4 and the wavelength correction relationship data. In addition, the light source control unit 71 corrects the modulation width of the semiconductor laser 2 by changing the drive voltage or the drive current for the semiconductor laser 2 using a detected temperature acquired by the temperature sensor 4 and the modulation correction relationship data.

Next, a sample gas is introduced into the cell 1 by an operator or automatically, and then the sample measurement is performed.

Specifically, in the sample measurement, the logarithmic calculation unit 81 calculates the logarithmic intensity L(t) by receiving an output signal from the light detector 5. Then, the correlation value calculation unit 82 calculates sample correlation values $S_1$, $S_2$, $S_3$ between the logarithmic intensity L(t) and the plurality of feature signals $F_1(t)$, $F_2(t)$, $F_3(t)$, and calculates, by subtracting the reference correlation values $R_i$ from these correlation values, sample correlation values $S'_1$, $S'_2$.

Further, the wavelength shift determination unit 84 determines the wavelength shift amount W by using the method described above.

The concentration calculation unit 85 determines, by using the single-presence correlation values at the wavelength shift amounts $w_k$ of the pieces of reference light stored in the storage unit 83 and the wavelength shift amount W determined by the wavelength shift determination unit 84, single-presence correlation values $s'_{1tar}$, $s'_{2tar}$, $s'_{1int}$, $s'_{2int}$ of the measurement target component and the interference component, corrected with the wavelength shift amount W. A conceivable method for the determination is, for example, a method using linear interpolation, quadratic interpolation, spline interpolation, or the like.

Figure 9:
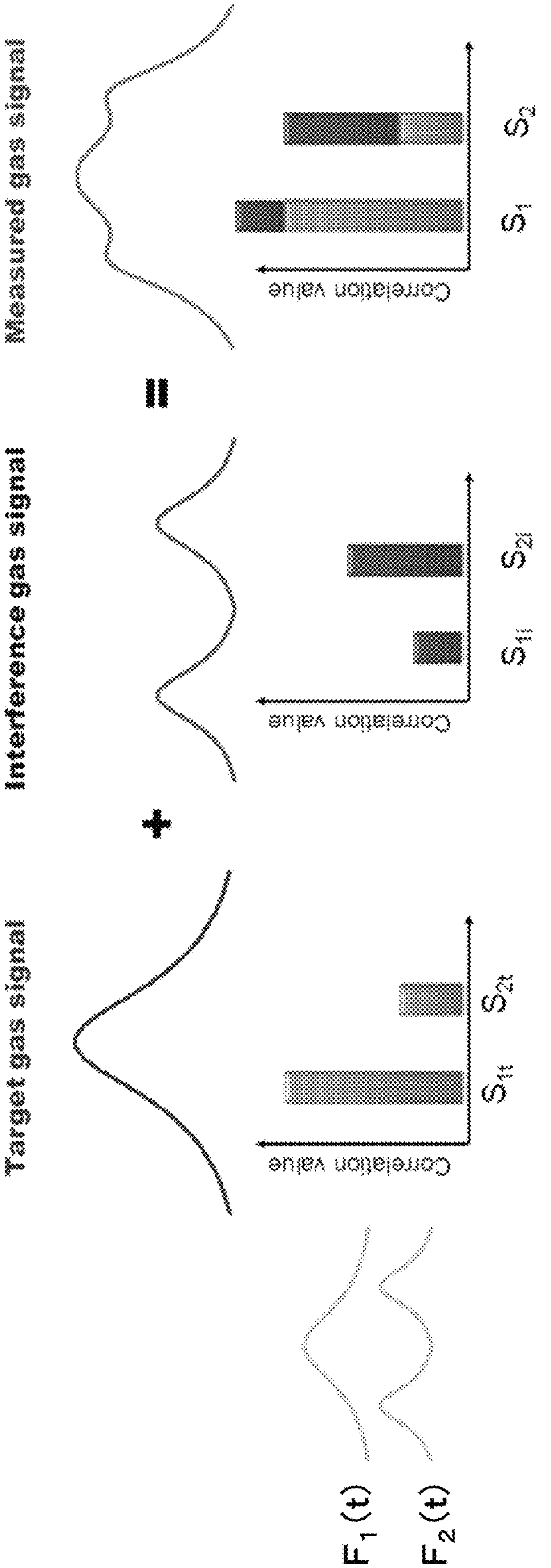
FIG. 9 is a diagram illustrating a conceptual diagram of concentration calculation using single-presence correlation values and actually measured correlation values, according to the embodiment.

Then, the concentration calculation unit 85 solves the following simultaneous equations with two unknowns, including the sample correlation values $S'_1$, $S'_2$ corrected with the reference correlation values and calculated by the correlation value calculation unit 82, the corrected single-presence correlation values $s'_{1tar}$, $s'_{2tar}$, $s'_{1int}$, $s'_{2int}$, and respective concentrations $C_{tar}$, $C_{int}$ of the measurement target component and the interference component (see FIG. 9).

$$s'_{1tar}\cdot C_{tar}+s'_{1int}\cdot C_{int}=S'_1 \qquad \text{[Formula 3]}$$

$$s'_{2tar}\cdot C_{tar}+s'_{2int}\cdot C_{int}=S'_2$$

Note that, even in a case where two or more interference components can be assumed to be present, by adding the single-presence correlation value in accordance with the number of interference components to solve simultaneous equations with the number of unknowns identical to the number of component types, it is possible to similarly determine the concentration of the measurement target component from which the interference influence and the coexistence influence are removed.

That is, in general, in a case where n types of gases whose number n is the total number of the measurement target component and the interference components are present, the following equations (Formula 4) are established, when $s'_{ij}$ is set to a corrected single-presence correlation value of the j-th gas type in the i-th feature signal, $C_j$ is set to a concentration of the j-th gas type, and $S'_i$ is set to a sample correlation value in the i-th feature signal $F_i(t)$.

$$s'_{11}C_1+s'_{12}C_2+s'_{13}C_3+\ldots+s'_{1n}C_n=S'_1 \qquad \text{[Formula 4]}$$

$$s'_{21}C_1+s'_{22}C_2+s'_{23}C_3+\ldots+s'_{2n}C_n=S'_2$$

$$s'_{31}C_1+s'_{32}C_2+s'_{33}C_3+\ldots+s'_{3n}C_n=S'_3$$

$$\vdots$$

$$s'_{n1}C_1+s'_{n2}C_2+s'_{n3}C_3+\ldots+s'_{nn}C_n=S'_n$$

By solving the simultaneous equations with n unknowns expressed by the equations (Formula 4), it is possible to determine the concentration, of each gas, that is, each of the measurement target component and the interference components, in which the interference influence is corrected. Note that, even in a case where no interference component is contained in a sample, it is possible to determine the concentration, of each gas, that is, each of the measurement target component and the interference components, in which the interference influence is corrected, by solving the simultaneous equations with n unknowns.

Effects of Present Embodiment

With the analysis device 100 of the present embodiment configured as described above, it is possible to measure with high accuracy the concentration of a measurement target component that is at least one of nitric oxide (NO), nitrogen dioxide ($NO_2$), nitrous oxide ($N_2O$), ammonia ($NH_3$), ethane ($C_2H_6$), formaldehyde (HCHO), acetaldehyde ($CH_3CHO$), sulfur dioxide ($SO_2$), methane ($CH_4$), methanol ($CH_3OH$), or ethanol ($C_2H_5OH$) contained in a combustion gas.

In addition, the drive voltage (or drive current) from the light source control unit 71 is changed based on the detected temperature acquired by the temperature sensor 4, which detects the ambient temperature of the laser light source 2, by using the modulation correction relationship data indicating the relationship between the ambient temperature of the laser light source 2 and the correction parameter for correcting the modulation width shift of the laser light source 2. Thus, it is possible to reduce change in the modulation width, for the oscillation wavelength of the laser light source, caused due to change in the ambient temperature. As a result, it is possible to reduce change in the absorption spectrum caused due to change occurring in the laser light source, thereby allowing the concentration of the measurement target component to be measured with high accuracy.

In particular, in the present embodiment, the wavelength shift and the modulation width shift caused due to the change in the ambient temperature are corrected. Thus, it is possible to set with high accuracy the wavelength modulation range in the case of measuring the concentration of ethane ($C_2H_6$), formaldehyde (HCHO), sulfur dioxide ($SO_2$), methane ($CH_4$), methanol ($CH_3OH$), or ethanol ($C_2H_5OH$) contained in the combustion gas. Therefore, it is possible to measure the concentration thereof with high accuracy.

In addition to the physical correction on the wavelength shift described above, the calculation is performed to determine the wavelength shift amount W of reference light, and by using the determined wavelength shift amount W, the concentration, of the measurement target component, in which the influence of the wavelength shift of the reference light is further corrected is calculated. Thus, it is possible to correct change in the light absorption spectrum of the measurement target component, caused by the wavelength shift of the reference light that cannot be reduced only by the physical correction on the wavelength shift. Therefore, it is possible to measure the concentration of the measurement target component with further high accuracy.

Further, according to the analysis device 100 of the present embodiment, the calculation is performed as to the correlation values $S_i$ between the logarithmic intensity L(t), which is the intensity-related signal related to the intensity of sample light, and the plurality of feature signals $F_i(t)$ for the logarithmic intensity L(t). Then, by using the plurality of calculated correlation values $S_i$, the calculation is performed as to the concentration of the measurement target component. Thus, it is possible to measure the concentration of the measurement target component with simple calculation, without converting the absorption signal into the absorption spectrum, with dramatically less variables to allow a grasp of the features of the absorption signal, and without performing complicated spectral calculation processing. For example, typical spectral fitting requires several hundreds of pieces of data. However, in the present invention, it is possible to calculate the concentration with equivalent accuracy, only by using at most several correlation values to several tens of correlation values. As a result, it is possible to dramatically reduce a load on the calculation processing, which eliminates the need for an advanced calculation processing device, thereby reducing the cost and the size of the analysis device 100.

Here, each of the signals used for the plurality of feature signals is a signal with which a correlation different from a correlation obtained from the sinusoidal wave signal can be obtained. Thus, it is possible to obtain the concentration of the measurement target component with accuracy equal to or higher than the accuracy of an analysis device that performs concentration calculation based on a method using conventional lock-in detection.

OTHER EMBODIMENTS

For example, although the logarithmic calculation unit 81 of the above embodiment performs logarithmic calculation on the light intensity signal from the light detector 5, the logarithmic calculation unit 81 may calculate logarithm of a ratio between the intensity of the sample light and the intensity of the modulated light that is the reference light (so-called absorbance), by using the light intensity signal from the light detector 5. At this time, the logarithmic calculation unit 81 may calculate the absorbance by calculating the logarithm of the intensity of the sample light while calculating the logarithm of the intensity of the reference light to then perform subtraction on the logarithms, or may calculate the absorbance by obtaining a ratio between the intensity of the sample light and the intensity of the reference light to then take the logarithm of the ratio.

Further, the correlation value calculation unit 82 of the above embodiment calculates the correlation value between the intensity-related signal and the feature signal. Alternatively, the correlation value calculation unit 82 may calculate a value of an inner product between the intensity-related signal and the feature signal.

Figure 10:
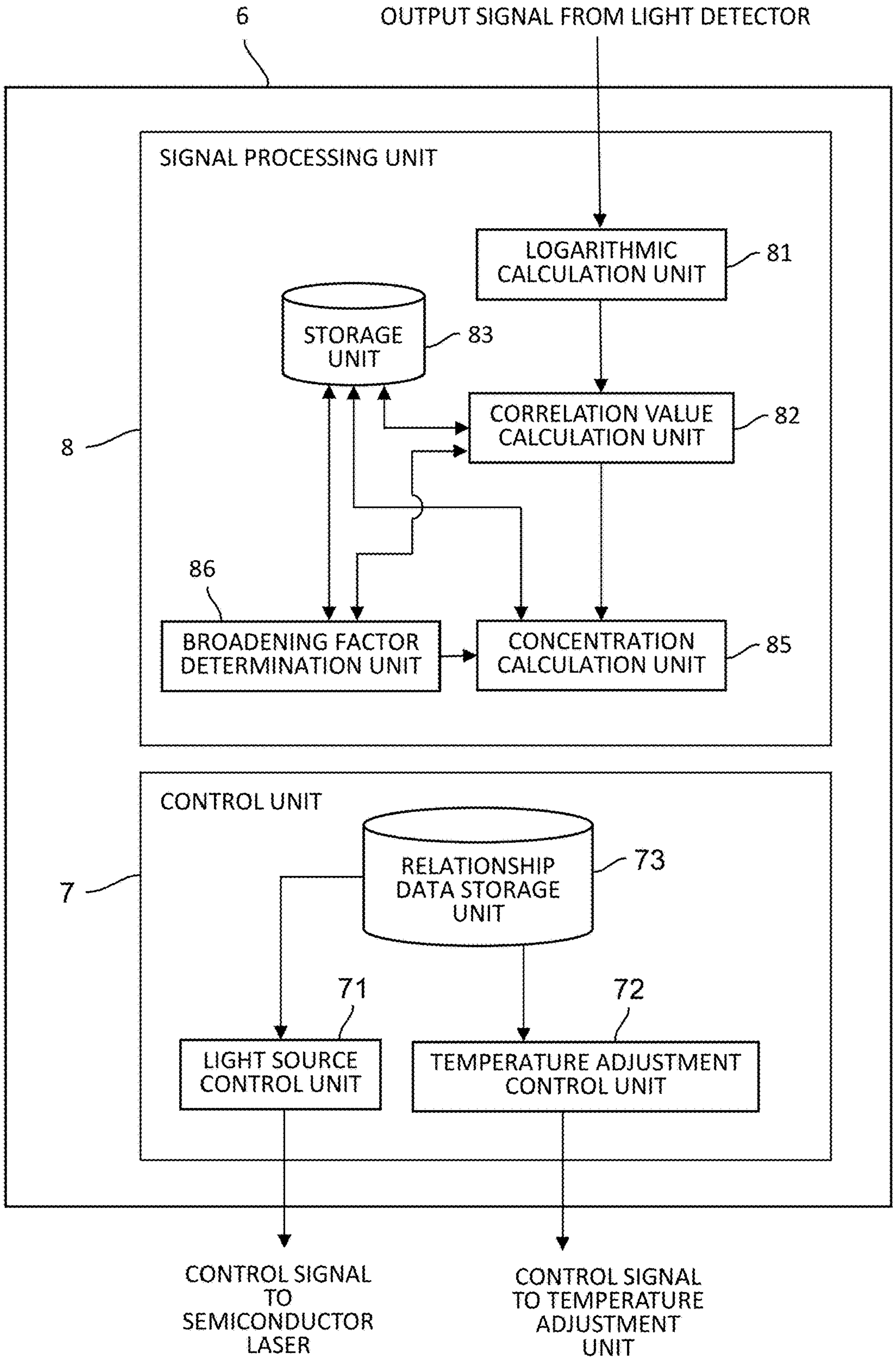
FIG. 10 is a functional block diagram of a signal processing device according to a modified embodiment.
Figure 12:
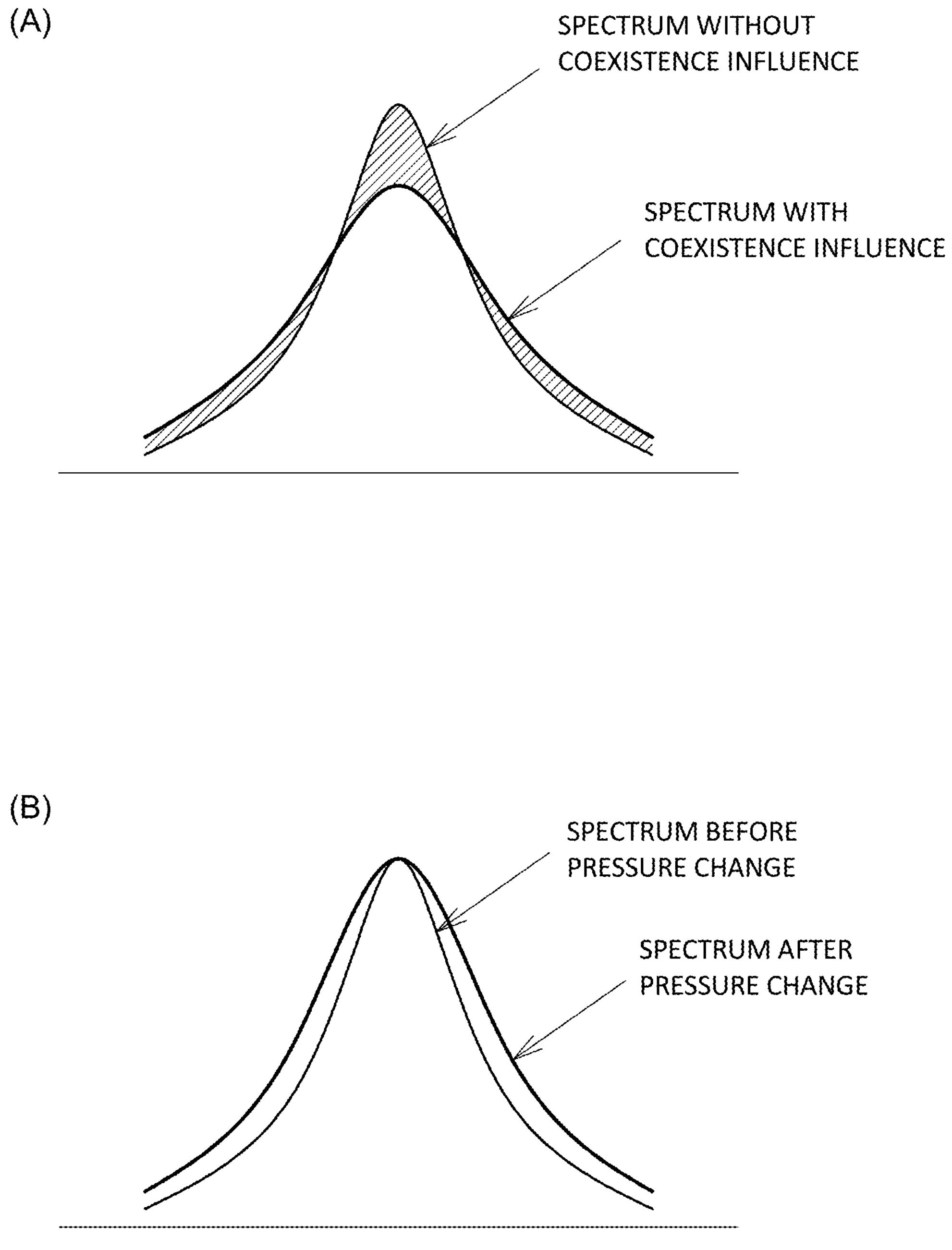
FIGS. 12A and 12B are schematic diagrams illustrating spectral change caused due to coexistence influence and spectral change caused due to pressure change.

Further, in addition to or instead of the function of correcting the wavelength shift occurring as to the analysis device 100 of the above embodiment, a function may be provided that corrects broadening (see FIGS. 12A and 12B) caused due to coexistence influence. In this case, as illustrated in FIG. 10, the signal processing unit 8 of the analysis device 100 includes a broadening factor determination unit 86 that determines a broadening factor indicating a rate of change in a light absorption spectrum of a measurement target component or an interference component, caused by a coexisting component included in a sample.

The broadening factor determination unit 86 determines a broadening factor $F_B$ indicating a rate of change in a light absorption spectrum of each of a measurement target component and an interference component, caused by a coexisting component included in a sample. Note that, when the coexistence influence of the coexisting component on the interference component should also be considered, the broadening factor $F_B$ is added and determined for each component.

A conceivable method of determining the broadening factor $F_B$ is, for example, the following procedure (a) or (b).

(a) The broadening factor $F_B$ is determined by comparison and matching. That is, first, respective single-presence correlation values $s_{itar}(p_k)$, $s_{iint}(p_k)$ of the measurement target component and the interference component, corresponding to the feature signals $F_i(t)$, at each pressure $p_k$ (k=1, 2, . . . , 1) in the cell, are obtained in advance. Then, sample correlation values obtained at the time of measurement are subjected to comparison and matching with the single-presence correlation values, to determine the broadening factor $F_B$. Note that, at the time of the comparison and the matching, the single-presence correlation value is used after being converted using a pressure value in the cell and the relationship expressed in the following equation (Formula 5). In the case of this method, the number of necessary feature signals is equal to or larger than the sum of the number of types of measurement target components, the number of types of interference components, and the number of types of broadening factors.

$$s'_{ij} = \frac{s_{ij}(F_B \cdot p)}{F_B} \quad \text{[Formula 5]}$$

Here, p is a pressure of a sample measured by a pressure sensor 7, $F_B$ is a broadening factor determined by the broadening factor determination unit 86, $s_{ij}$ is a single-presence correlation value at each pressure stored in the storage unit 83, and $s'_{ij}$ is a corrected single-presence correlation value. Note that the above equation (Formula 5) represents the following content. That is, there is the single-presence correlation value $s_{ij}(p)$ at the pressure p of the sample at the time of the sample measurement, the pressure of this single-presence correlation value $s_{ij}(p)$ is multiplied by $F_B$, and the single-presence correlation value with the multiplied pressure is multiplied by $1/F_B$, whereby the corrected single-presence correlation value $s'_{ij}$ is obtained.

Note that, when the interference component is also affected by the broadening due to the coexisting component, the broadening factor of the interference component may be separately determined to correct the single-presence correlation value of the interference component. As a result, accuracy of measurement can be further improved.

(b) The broadening factor $F_B$ is determined by using relationship data indicating the relationship between a concentration of the coexisting component and the broadening factor $F_B$, and a measured concentration of the coexisting component.

At this time, the relationship data is generated in advance by obtaining the broadening factor $F_B$ for each concentration of the coexisting component through experiment or calculation. The measured concentration of the coexisting component may be measured by using the analysis device 100 of the present embodiment before the coexistence influence is corrected, or may be a concentration of the coexisting component measured by using another analysis device.

The concentration calculation unit 85 calculates the concentration of the measurement target component by using the plurality of sample correlation values obtained by the correlation value calculation unit 82.

Specifically, the concentration calculation unit 85 calculates the concentration of the measurement target component, based on the plurality of sample correlation values obtained by the correlation value calculation unit 82, the broadening factor $F_B$ determined by the broadening factor determination unit 86, and the plurality of single-presence correlation values stored in the storage unit 83. More specifically, the concentration calculation unit 85 corrects the plurality of single-presence correlation values stored in the storage unit 83 based on the broadening factor $F_B$ obtained by the broadening factor determination unit 86, to obtain a plurality of corrected single-presence correlation values. Then, the concentration calculation unit 85 calculates the concentration of the measurement target component by solving simultaneous equations including the plurality of sample correlation values obtained by the correlation value calculation unit 82, the plurality of corrected single-presence correlation values corresponding to the determined broadening factor $F_B$, and the concentrations of the measurement target component and each interference component.

More specifically, by using the single-presence correlation values, at each pressure $p_k$ in the cell, stored in the storage unit 83, the pressure value p in the cell measured by the pressure sensor 7, the broadening factor $F_B$ determined by the broadening factor determination unit 86, and the above equation (Formula 5), the concentration calculation unit 85 determines single-presence correlation values $s'_{1tar}$, $s'_{2tar}$ of the measurement target component corrected with both the pressure in the cell and the broadening factor, and single-presence correlation values $s'_{1int}$, $S'_{2int}$ of the interference component corrected only with the pressure in the cell (the broadening factor is set to one). A conceivable method for the determination is, for example, a method using linear interpolation, quadratic interpolation, spline interpolation, or the like.

Then, the concentration calculation unit 85 solves the following simultaneous equations with two unknowns including the sample correlation values $S'_1$, $S'_2$ corrected with the reference correlation values and calculated by the correlation value calculation unit 82, the corrected single-presence correlation values $s'_{1tar}$, $s'_{2tar}$, $s'_{1int}$, $s'_{2int}$, and respective concentrations $C_{tar}$, $C_{int}$ of the measurement target component and the interference component.

$$s'_{1tar}\cdot C_{tar}+s'_{1int}\cdot C_{int}=S'_1 \quad \text{[Formula 6]}$$

$$s'_{2tar}\cdot C_{tar}+s'_{2int}\cdot C_{int}=S'_2$$

As a result, with a simple and reliable calculation of solving the simultaneous equations expressed as the above equations (Formula 6), it is possible to determine the concentration $C_{tar}$ of the measurement target component from which the interference influence and the coexistence influence are removed. According to this configuration, it is possible to correctly correct the broadening caused due to the coexistence influence, while reducing the change in the modulation width of the laser light source caused due to the change in the ambient temperature by the correction on the modulation width of the laser light source 2 of the present invention. Thus, it is possible to measure the concentration of the measurement target component with further high accuracy.

Figure 11:
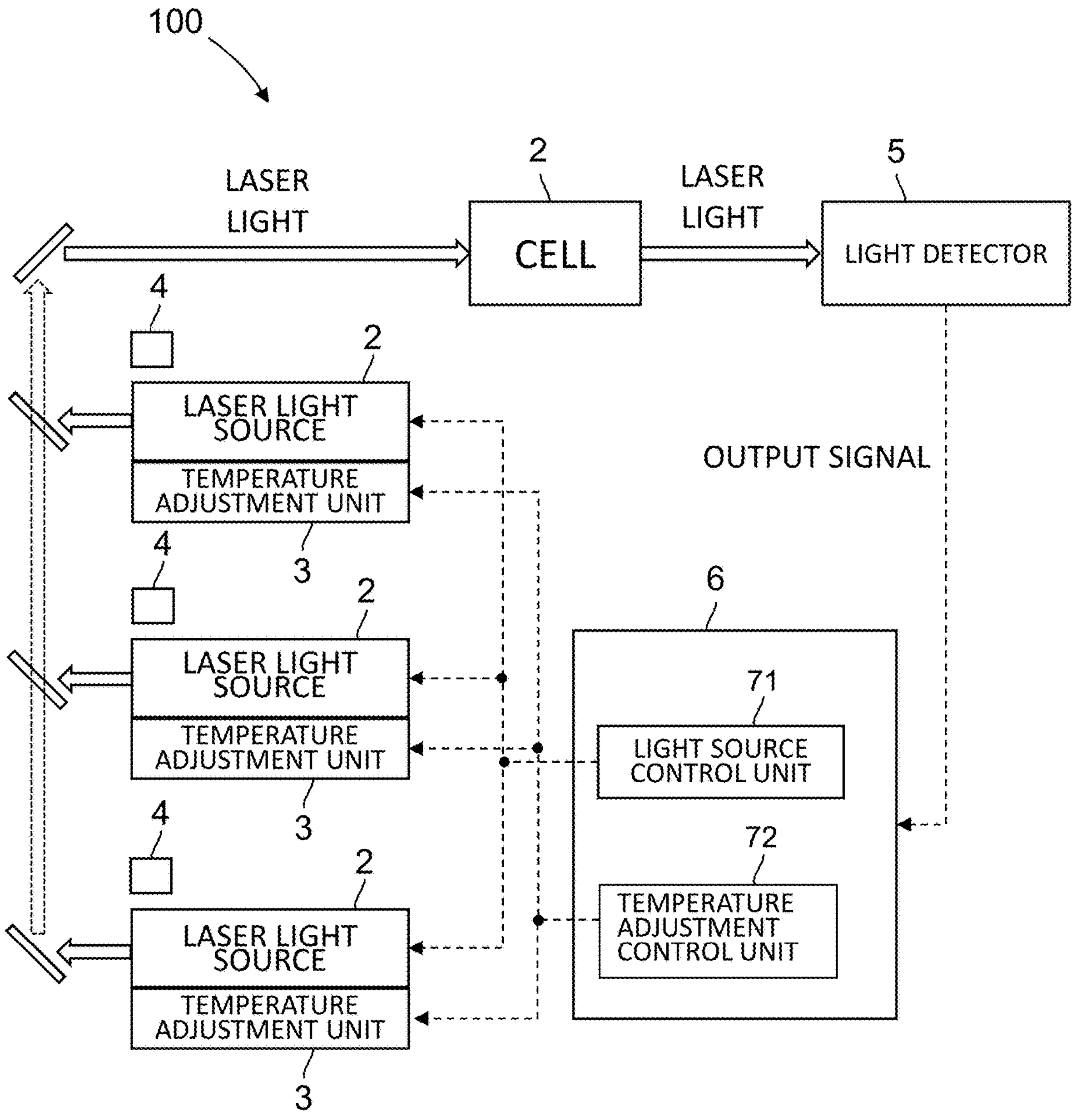
FIG. 11 is an overall schematic diagram of an analysis device according to another modified embodiment.

Further, as illustrated in FIG. 11, the analysis device 100 may include a plurality of laser light sources 2 that irradiate the cell 1 with laser light, and a plurality of temperature adjustment units 3 corresponding to the plurality of laser light sources 2. The plurality of laser light sources 2 is, for example, considered to be configured to handle the measurement target component exemplified in the above embodiment. Here, in the analysis device 100, the plurality of laser light sources 2 is caused to generate pulse oscillations by the light source control unit 71 such that the pulse oscillations have the same oscillation period and have respective different oscillation timings. Here, details of control performed by the light source control unit 71 and the temperature adjustment control unit 72 for each laser light source 2 and each temperature adjustment unit 3, respectively, are the same as those in the above embodiment. The signal processing device 6 separates respective signals of the plurality of laser light sources 2 from a light intensity signal obtained by the light detector 5, and calculates the concentration of a measurement target component, corresponding to each laser light source 2 by using the separated light absorption signal of each laser light source 2. Note that the calculation of the concentration of the measurement target component performed by the signal processing unit 8 is similar to the calculation in the above embodiment.

In the above embodiment, the wavelength shift is corrected by calculation while the wavelength shift is corrected physically. Alternatively, the correction on the wavelength shift by calculation need not be performed. Alternatively, the correction on the wavelength shift by calculation may be performed without performing the physical correction on the wavelength shift. Alternatively, neither the physical correction on the wavelength shift nor the correction on the wavelength shift by calculation may be performed.

In the above embodiment, the modulation width shift as well as the wavelength shift caused due to the ambient temperature is corrected. Alternatively, a configuration may be adopted in which the modulation width shift is not corrected.

In the above embodiment, the storage unit 83 stores the single-presence correlation value corrected with the reference correlation value. Alternatively, the storage unit 83 may be configured to store a single-presence correlation value before the correction, and the concentration calculation unit 85 may be configured to obtain a single-presence correlation value per unit concentration on which correction is performed by subtracting the reference correlation value from the single-presence correlation value before the correction to convert it into the single-presence correlation value per unit concentration.

The plurality of feature signals is not limited to those in the above embodiment. Alternatively, the plurality of feature signals is simply required to be provided as functions different from each other. Alternatively, as the feature signal, for example, a function may be used that indicates a waveform (sample spectrum) of light intensity, logarithmic intensity, or absorbance obtained by causing a span gas having a known concentration to flow. In addition, when the concentration of a single measurement target component is measured, at least one feature signal is simply required to be provided.

Further, in a case where n types of gases whose number n is the total number of the measurement target component and the interference components are present, the respective concentrations of the components may be determined by the following method. In this method, by using types of feature signals whose number is larger than n, single-presence correlation values and sample correlation values whose number is larger than the number of the types of gases are obtained. Then, simultaneous equations are prepared to have unknowns whose number is larger than the number of the types of gases. Subsequently, the least squares method is used to determine the concentrations of the components. With this method, it is possible to determine the concentrations while an error is reduced even with respect to measurement noise.

The signal processing unit of the above embodiment functions as the correlation value calculation unit that calculates the correlation value depending on the concentration of the measurement target component by using the intensity-related signal related to the intensity of the sample light and the feature signal from which a predetermined correlation is obtained with respect to the intensity-related signal, and as the concentration calculation unit that calculates the concentration of the measurement target component by using the correlation value obtained by the correlation value calculation unit. However, alternatively, the signal processing unit may use another calculation method.

The light source may be another type of laser instead of the semiconductor laser, or any light source may be used as long as the light source is a single-wavelength light source that has a half width sufficient to secure accuracy of measurement and can perform wavelength modulation.

Further, various modifications and combinations of the embodiments may be made without departing from the gist of the present invention.

INDUSTRIAL APPLICABILITY

According to the present invention, it is possible to measure with high accuracy a concentration of a measurement target component that is at least one of nitric oxide, nitrogen dioxide, nitrous oxide, ammonia, ethane, formaldehyde, acetaldehyde, sulfur dioxide, methane, methanol, or ethanol contained in a combustion gas.

REFERENCE SIGNS LIST

100 analysis device
1 cell
2 laser light source (semiconductor laser)
3 temperature adjustment unit
4 temperature sensor
5 light detector
6 signal processing device
7 control unit
81 logarithmic calculation unit
82 correlation value calculation unit
83 storage unit
84 wavelength shift determination unit
85 concentration calculation unit

The invention claimed is:

1. An analysis device configured to measure a concentration of a measurement target component that is at least one of nitric oxide, nitrogen dioxide, nitrous oxide, ammonia, ethane, formaldehyde, acetaldehyde, sulfur dioxide, methane, methanol, or ethanol contained in a combustion gas, the analysis device comprising:

a laser light source configured to irradiate the combustion gas with reference light;

a light detector configured to detect intensity of sample light obtained when the reference light is transmitted through the combustion gas; and a concentration calculation unit configured to calculate the concentration of the measurement target component (i) based on an output signal from the light detector and (ii) using a selected absorption wavelength range of the measurement target component such that absorption by an interference component contained in the combustion gas is smaller than absorption by the interference component at other wavelengths within a predetermined wavelength region in which the measurement target component exhibits absorption, wherein the concentration calculation unit is configured to:

when a concentration of the nitric oxide is measured, calculate the concentration of the nitric oxide based on absorption between 5.24 and 5.26 μm by the nitric oxide;

when a concentration of the nitrogen dioxide is measured, calculate the concentration of the nitrogen dioxide based on absorption between 6.14 and 6.26 μm by the nitrogen dioxide;

when a concentration of the nitrous oxide is measured, calculate the concentration of the nitrous oxide based on absorption between 7.84 and 7.91 μm by the nitrous oxide;

when a concentration of the ammonia is measured, calculate the concentration of the ammonia based on absorption between 9.38 and 9.56 μm by the ammonia;

when a concentration of the ethane is measured, calculate the concentration of the ethane based on absorption between 3.33 and 3.36 μm by the ethane;

when a concentration of the formaldehyde or the acetaldehyde is measured, calculate the concentration of the formaldehyde or the acetaldehyde based on absorption between 5.65 and 5.67 μm by the formaldehyde or the acetaldehyde;

when a concentration of the sulfur dioxide is measured, calculate the concentration of the sulfur dioxide based on absorption between 7.38 and 7.42 μm by the sulfur dioxide;

when a concentration of the methane is measured, calculate the concentration of the methane based on absorption between 7.50 and 7.54 μm by the methane; and when a concentration of the methanol or the ethanol is measured, calculate the concentration of the methanol or the ethanol based on absorption between 9.45 and 9.47 μm by the methanol or the ethanol.

2. The analysis device according to claim 1, wherein the concentration calculation unit is configured to:

when the concentration of the nitric oxide is measured, calculate the concentration of the nitric oxide based on absorption between 5.245 and 5.247 μm by the nitric oxide;

when the concentration of the nitrogen dioxide is measured, calculate the concentration of the nitrogen dioxide based on absorption between 6.145 and 6.254 μm by the nitrogen dioxide;

when the concentration of the nitrous oxide is measured, calculate the concentration of the nitrous oxide based on absorption between 7.845 and 7.907 μm by the nitrous oxide;

when the concentration of the ammonia is measured, calculate the concentration of the ammonia based on absorption between 9.384 and 9.557 μm by the ammonia;

when the concentration of the ethane is measured, calculate the concentration of the ethane based on absorption between 3.336 and 3.352 μm by the ethane;

when the concentration of the formaldehyde or the acetaldehyde is measured, calculate the concentration of the formaldehyde or the acetaldehyde based on absorption between 5.651 and 5.652 μm, or between 5.665 and 5.667 μm by the formaldehyde or the acetaldehyde;

when the concentration of the sulfur dioxide is measured, calculate the concentration of the sulfur dioxide based on absorption between 7.385 and 7.417 μm by the sulfur dioxide;

when the concentration of the methane is measured, calculate the concentration of the methane based on absorption between 7.503 and 7.504 μm, or between 7.535 and 7.536 μm by the methane; and when the concentration of the methanol or the ethanol is measured, calculate the concentration of the methanol or the ethanol based on absorption between 9.467 and 9.468 μm, or between 9.455 and 9.456 μm by the methanol or the ethanol.

3. The analysis device according to claim 1, wherein the concentration calculation unit is configured to:

when the concentration of the nitric oxide is measured, calculate the concentration of the nitric oxide based on absorption at 5.2462 μm by the nitric oxide;

when the concentration of the nitrogen dioxide is measured, calculate the concentration of the nitrogen dioxide based on absorption at 6.2322 μm or 6.2538 μm by the nitrogen dioxide;

when the concentration of the nitrous oxide is measured, calculate the concentration of the nitrous oxide based on absorption at 7.8455 μm, 7.8509 μm, 7.8784 μm, or 7.9067 μm by the nitrous oxide;

when the concentration of the ammonia is measured, calculate the concentration of the ammonia based on absorption at 9.3847 μm or 9.5566 μm by the ammonia;

when the concentration of the ethane is measured, calculate the concentration of the ethane based on absorption at 3.3368 μm, 3.3482 μm, or 3.3519 μm by the ethane;

when the concentration of the formaldehyde or the acetaldehyde is measured, calculate the concentration of the formaldehyde or the acetaldehyde based on absorption at 5.6514 μm or 5.6660 μm by the formaldehyde or the acetaldehyde;

when the concentration of the sulfur dioxide is measured, calculate the concentration of the sulfur dioxide based on absorption at 7.3856 μm or 7.4163 μm by the sulfur dioxide;

when the concentration of the methane is measured, calculate the concentration of the methane based on absorption at 7.5035 μm or 7.5354 μm by the methane; and when the concentration of the methanol or the ethanol is measured, calculate the concentration of the methanol or the ethanol based on absorption at 9.4671 μm or 9.4557 μm by the methanol or the ethanol.

4. The analysis device according to claim 1, wherein the concentration calculation unit is configured to calculate the concentration of the measurement target component by correcting interference influence of an interference component that is a component other than the measurement target component contained in the combustion gas.

5. The analysis device according to claim 4, wherein the interference component is water, carbon dioxide, and/or a hydrocarbon.

6. The analysis device according to claim 1, wherein the laser light source is a quantum cascade laser.

7. The analysis device according to claim 1, further comprising a cell into which the combustion gas is introduced, wherein the cell is a multireflection cell or a resonance cell.

8. An analysis method of measuring a concentration of a measurement target component that is at least one of nitric oxide, nitrogen dioxide, nitrous oxide, ammonia, ethane, formaldehyde, acetaldehyde, sulfur dioxide, methane, methanol, or ethanol contained in a combustion gas, the analysis method comprising:

calculating the concentration of the measurement target component using a selected absorption wavelength range of the measurement target component such that absorption by an interference component contained in the combustion gas is smaller than absorption by the interference component at other wavelengths within a predetermined wavelength region in which the measurement target component exhibits absorption;

when a concentration of the nitric oxide is measured, calculating the concentration of the nitric oxide based on absorption between 5.24 and 5.26 μm by the nitric oxide;

when a concentration of the nitrogen dioxide is measured, calculating the concentration of the nitrogen dioxide based on absorption between 6.14 and 6.26 μm by the nitrogen dioxide;

when a concentration of the nitrous oxide is measured, calculating the concentration of the nitrous oxide based on absorption between 7.84 and 7.91 μm by the nitrous oxide;

when a concentration of the ammonia is measured, calculating the concentration of the ammonia based on absorption between 9.38 and 9.56 μm by the ammonia;

when a concentration of the ethane is measured, calculating the concentration of the ethane based on absorption between 3.33 and 3.36 μm by the ethane;

when a concentration of the formaldehyde or the acetaldehyde is measured, calculating the concentration of the formaldehyde or the acetaldehyde based on absorption between 5.65 and 5.67 μm by the formaldehyde or the acetaldehyde;

when a concentration of the sulfur dioxide is measured, calculating the concentration of the sulfur dioxide based on absorption between 7.38 and 7.42 μm by the sulfur dioxide;

when a concentration of the methane is measured, calculating the concentration of the methane based on absorption between 7.50 and 7.54 μm by the methane; and when a concentration of the methanol or the ethanol is measured, calculating the concentration of the methanol or the ethanol based on absorption between 9.45 and 9.47 μm by the methanol or the ethanol.

* * * * *